(12) United States Patent
Moore et al.

(10) Patent No.: US 7,382,868 B2
(45) Date of Patent: Jun. 3, 2008

(54) TELEPHONY SERVICES SYSTEM WITH INSTANT COMMUNICATIONS ENHANCEMENTS

(75) Inventors: Richard G. Moore, Cedar Rapids, IA (US); Gregory L. Mumsford, Marion, IA (US); Duraisamy Gunasekar, Cedar Rapids, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 650 days.

(21) Appl. No.: 10/404,094

(22) Filed: Apr. 2, 2003

(65) Prior Publication Data

US 2003/0185360 A1 Oct. 2, 2003

Related U.S. Application Data

(60) Provisional application No. 60/369,271, filed on Apr. 2, 2002.

(51) Int. Cl.
 *H04M 15/00* (2006.01)
(52) U.S. Cl. .................. 379/114.01; 370/352; 370/401
(58) Field of Classification Search ................ 379/111, 379/115.01, 115.03, 121.01, 126, 88.13, 88.14, 379/88.18, 88.19, 88.21
 See application file for complete search history.

(56) References Cited

U.S. PATENT DOCUMENTS

| | | | |
|---|---|---|---|
| 5,740,230 A | 4/1998 | Vaudreuil | |
| 5,809,128 A | 9/1998 | McMullin | |
| 5,845,267 A | 12/1998 | Ronen | |
| 5,848,134 A | 12/1998 | Sekiguchi et al. | |
| 5,884,266 A | 3/1999 | Dvorak | |
| 5,930,344 A | 7/1999 | Relyea et al. | |
| 5,941,947 A | 8/1999 | Brown et al. | |
| 5,951,694 A | 9/1999 | Choquier et al. | |
| 5,963,217 A | 10/1999 | Grayson et al. | |
| 5,978,669 A | 11/1999 | Sanmugam | |
| 6,011,837 A * | 1/2000 | Malik ...................... | 379/114.1 |
| 6,029,195 A | 2/2000 | Herz | |
| 6,064,723 A | 5/2000 | Cohn et al. | |
| 6,076,100 A | 6/2000 | Cottrille et al. | |
| 6,078,583 A | 6/2000 | Takahara et al. | |
| 6,101,473 A | 8/2000 | Scott et al. | |
| 6,128,601 A | 10/2000 | Van Horne et al. | |
| 6,173,250 B1 | 1/2001 | Jong | |
| 6,175,619 B1 | 1/2001 | Desimone | |

(Continued)

FOREIGN PATENT DOCUMENTS

WO 00/69140 11/2000

(Continued)

OTHER PUBLICATIONS

Colbert et al., "Advanced Services: Changing How We Communicate", Bell Labs Technology, Bell Laboratories, Murrey Hill, NJ, US, vol. 6, No. 1, Jan. 2001, pp. 211-228.

(Continued)

*Primary Examiner*—Binh K. Tieu

(57) ABSTRACT

An interactive telephony services system is provided with instant communications function. In accordance with some embodiments, presence information related to the availability of a called party to be contacted via instant communications affects the handling of telephone calls to the called party. In accordance with some embodiments, a telephone call may be connected to an instant communications client used by a called party.

91 Claims, 22 Drawing Sheets

U.S. PATENT DOCUMENTS

| | | |
|---|---|---|
| 6,175,819 B1 | 1/2001 | Van Alstine |
| 6,188,761 B1 | 2/2001 | Dickerman et al. |
| 6,199,114 B1 | 3/2001 | White et al. |
| 6,219,646 B1 | 4/2001 | Cherny |
| 6,226,364 B1 | 5/2001 | O'Neill |
| 6,226,366 B1 | 5/2001 | Bala et al. |
| 6,243,450 B1 | 6/2001 | Jansen et al. |
| 6,252,869 B1 | 6/2001 | Silverman |
| 6,252,952 B1 | 6/2001 | Kung et al. |
| 6,263,072 B1 | 7/2001 | Booton |
| 6,266,401 B1 | 7/2001 | Marchbanks et al. |
| 6,269,336 B1 | 7/2001 | Ladd et al. |
| 6,282,275 B1 | 8/2001 | Gurbani et al. |
| 6,285,749 B1 | 9/2001 | Manto |
| 6,301,609 B1 | 10/2001 | Aravamudan et al. |
| 6,314,178 B1 | 11/2001 | Walker et al. |
| 6,337,858 B1 | 1/2002 | Petty et al. |
| 6,373,817 B1 | 4/2002 | Kung et al. |
| 6,377,938 B1 | 4/2002 | Block et al. |
| 6,385,729 B1 | 5/2002 | DiGiorgio et al. |
| 6,389,114 B1 | 5/2002 | Dowens et al. |
| 6,389,398 B1 | 5/2002 | Lustgarten et al. |
| 6,393,113 B1 | 5/2002 | Karras |
| 6,393,412 B1 | 5/2002 | Deep |
| 6,393,461 B1 | 5/2002 | Okada et al. |
| 6,430,602 B1 | 8/2002 | Kay et al. |
| 6,453,294 B1 | 9/2002 | Dutta et al. |
| 6,564,261 B1 | 5/2003 | Gudjonsson |
| 6,600,733 B2 | 7/2003 | Deng |
| 6,606,644 B1 | 8/2003 | Ford et al. |
| 6,651,086 B1 | 11/2003 | Manber et al. |
| 6,658,246 B1 | 12/2003 | Helaine |
| 6,668,169 B2 | 12/2003 | Burgan et al. |
| 6,694,007 B2 | 2/2004 | Lang et al. |
| 6,697,474 B1 | 2/2004 | Hanson et al. |
| 6,704,396 B2 | 3/2004 | Parolkar et al. |
| 6,714,519 B2 | 3/2004 | Luzzatti et al. |
| 6,747,970 B1* | 6/2004 | Lamb et al. ................. 370/352 |
| 6,757,365 B1* | 6/2004 | Bogard .................... 379/88.17 |
| 6,775,370 B2 | 8/2004 | Burg |
| 6,788,674 B1 | 9/2004 | Karamchedu et al. |
| 6,788,769 B1 | 9/2004 | Waites |
| 6,807,565 B1 | 10/2004 | Dodrill et al. |
| 6,807,574 B1 | 10/2004 | Partovi et al. |
| 6,816,578 B1 | 11/2004 | Kredo et al. |
| 6,823,047 B1 | 11/2004 | Cruickshank |
| 6,907,239 B1 | 6/2005 | Sivula |
| 6,938,076 B2* | 8/2005 | Meyer et al. ................ 709/219 |
| 6,941,345 B1 | 9/2005 | Kapil et al. |
| 6,970,553 B1 | 11/2005 | Gao et al. |
| 6,987,841 B1* | 1/2006 | Byers et al. ............. 379/88.17 |
| 7,058,036 B1 | 6/2006 | Yu et al. |
| 7,065,185 B1 | 6/2006 | Koch |
| 7,065,186 B1 | 6/2006 | Myers et al. |
| 7,216,143 B2 | 5/2007 | Creamer et al. |
| 2001/0003202 A1 | 6/2001 | Neils et al. |
| 2001/0033298 A1 | 10/2001 | Slotznick |
| 2001/0034718 A1 | 10/2001 | Shaked et al. |
| 2001/0038624 A1 | 11/2001 | Greenberg et al. |
| 2001/0047333 A1 | 11/2001 | Jung-Gi et al. |
| 2001/0048736 A1 | 12/2001 | Walker et al. |
| 2001/0056389 A1 | 12/2001 | Fair et al. |
| 2002/0007276 A1 | 1/2002 | Rosenblatt |
| 2002/0019846 A1 | 2/2002 | Miloslavaky et al. |
| 2002/0022954 A1 | 2/2002 | Shimohata et al. |
| 2002/0035605 A1 | 3/2002 | McDowell et al. |
| 2002/0037074 A1 | 3/2002 | Dowens et al. |
| 2002/0037735 A1 | 3/2002 | Maggenti et al. |
| 2002/0038212 A1 | 3/2002 | Bernard |
| 2002/0059138 A1 | 5/2002 | Priest et al. |
| 2002/0059148 A1 | 5/2002 | Rosenhaft et al. |
| 2002/0067714 A1 | 6/2002 | Crain et al. |
| 2002/0071539 A1 | 6/2002 | Diament et al. |
| 2002/0073207 A1 | 6/2002 | Widger |
| 2002/0082905 A1 | 6/2002 | Matsuda |
| 2002/0083127 A1 | 6/2002 | Agrawal |
| 2002/0087645 A1 | 7/2002 | Ertugrul et al. |
| 2002/0087704 A1 | 7/2002 | Chesnais et al. |
| 2002/0103917 A1 | 8/2002 | Kay et al. |
| 2002/0111813 A1 | 8/2002 | Capps |
| 2002/0116464 A1* | 8/2002 | Mak ........................... 709/206 |
| 2002/0122391 A1 | 9/2002 | Shalit |
| 2002/0136390 A1 | 9/2002 | Lang et al. |
| 2002/0146005 A1 | 10/2002 | Gallant et al. |
| 2002/0160757 A1 | 10/2002 | Shavit |
| 2003/0002633 A1 | 1/2003 | Kredo et al. |
| 2003/0005076 A1 | 1/2003 | Koch et al. |
| 2003/0028380 A1* | 2/2003 | Freeland et al. ............ 704/260 |
| 2003/0069934 A1 | 4/2003 | Garcia-Martin et al. |
| 2003/0078987 A1 | 4/2003 | Serebrennikov |
| 2003/0097413 A1 | 5/2003 | Vishik et al. |
| 2003/0110044 A1 | 6/2003 | Nix et al. |
| 2003/0112930 A1 | 6/2003 | Bosik et al. |
| 2003/0112948 A1 | 6/2003 | Brown et al. |
| 2003/0112952 A1 | 6/2003 | Brown et al. |
| 2003/0125927 A1 | 7/2003 | Seme |
| 2003/0126213 A1 | 7/2003 | Betzler |
| 2003/0161451 A1 | 8/2003 | Fitzpatrick et al. |
| 2003/0185359 A1* | 10/2003 | Moore et al. .......... 379/114.01 |
| 2003/0187650 A1* | 10/2003 | Moore et al. ............... 704/260 |
| 2003/0193961 A1* | 10/2003 | Moore et al. ............... 370/401 |
| 2004/0086100 A1* | 5/2004 | Moore et al. .......... 379/201.01 |
| 2005/0074101 A1* | 4/2005 | Moore et al. .......... 379/114.01 |
| 2005/0136899 A1 | 6/2005 | Pines et al. |

FOREIGN PATENT DOCUMENTS

| | | |
|---|---|---|
| WO | 01/35615 | 5/2001 |
| WO | 02/093889 | 11/2002 |

OTHER PUBLICATIONS

Rosenberg et al., "SIP: Session Initiation Protocol", Internet Engineering Task Force, Internet Draft, Feb. 27, 2002.

Pan et al., DIAMETER: Policy and Accounting Extension for SIP, Internet Draft, Nov. 15, 1998.

Rosenberg et al., "An Application Server Component Architecture for SIP", Internet Engineering Task Force, Internet Draft, Mar. 2, 2001.

Steul, D., "Redeining the Call Center: Customer Service on the Internet", Alcatel Telecommunications Review, Alcatel, Paris Cedex, France, 2000.

* cited by examiner

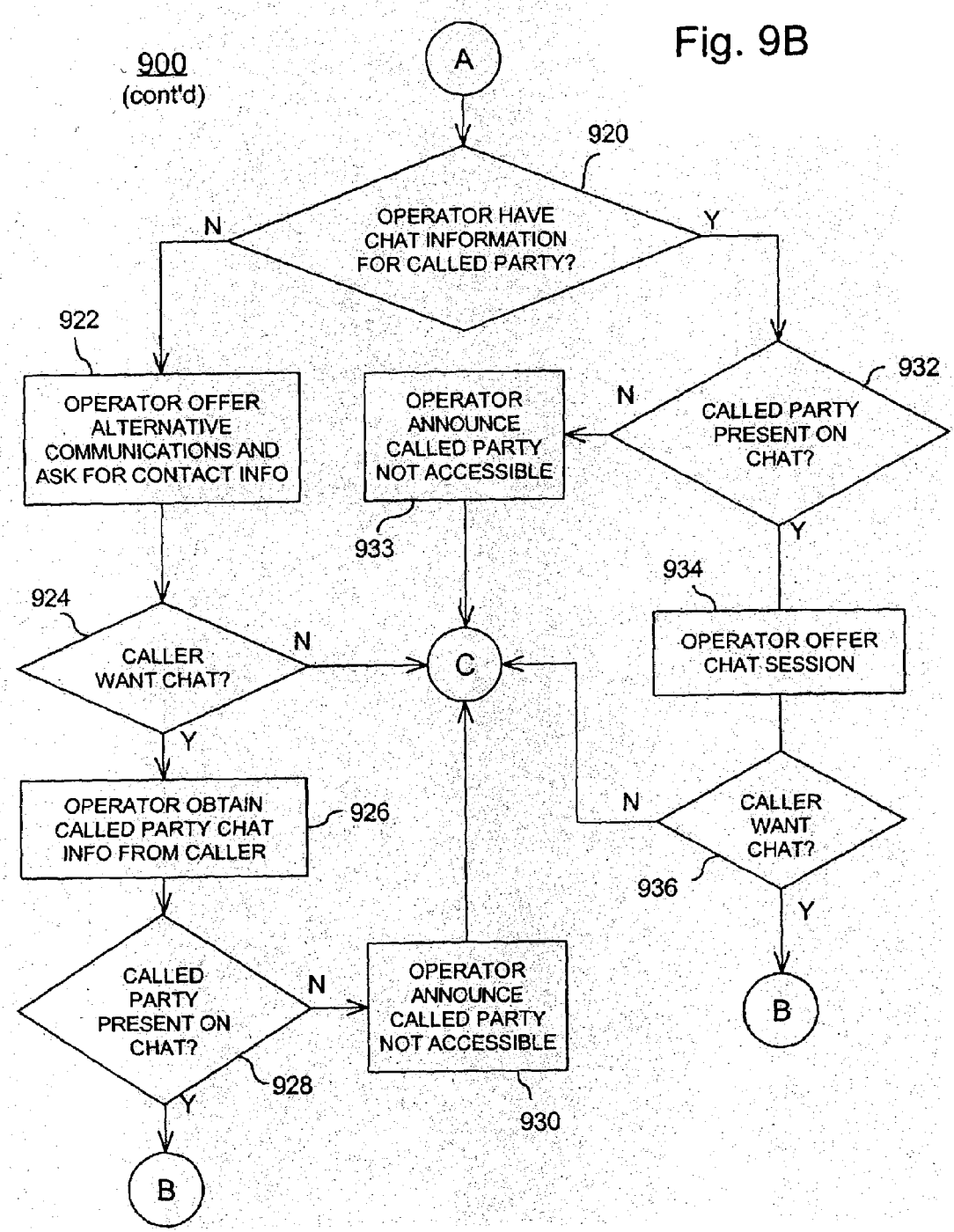

TELEPHONY SERVICES SYSTEM WITH INSTANT COMMUNICATIONS ENHANCEMENTS

PRIORITY CLAIM AND CROSS-REFERENCE

The present application claims priority to U.S. Provisional Patent Application Ser. No. 60/369,271, filed Apr. 2, 2002, entitled "Chat-Accessible Services in a Communication System," assigned to the assignee of the present application and incorporated herein by reference its entirety.

The present application is also related to the following co-pending applications, which are assigned to the assignee of the present application and incorporated herein by reference in their entireties:

- U.S. patent application Ser. No. 10/404,110, filed concurrently herewith and entitled "Billing System for Services Provided via Instant Communications;"
- U.S. patent application Ser. No. 10/404,111, filed concurrently herewith and entitled "Messaging Response System;"
- U.S. patent application Ser. No. 10/404,113, filed concurrently herewith and entitled "Communications Gateway with Messaging Communications Interface;"
- U.S. patent application Ser. No. 10/404,093, filed concurrently herewith and entitled "Media Translator;"
- U.S. patent application Ser. No. 10/404,104, filed concurrently herewith and entitled "Billing System for Communications Services involving Telephony and Instant Communications;"
- U.S. patent application Ser. No. 10/404,330, filed concurrently herewith and entitled "Call Completion via Instant Communications Client;"
- U.S. patent application Ser. No. 10,404,079, filed concurrently herewith and entitled "Enhanced Services Call Completion;" and
- U.S. patent application Ser. Nos. 10/404,541, filed concurrently herewith and entitled "Providing of Presence Information to a Telephony Services System."

TECHNICAL FIELD

The present invention relates to communications systems and methods and more particularly to facilitating the establishment of communications among users of communications systems.

BACKGROUND

A communications system serves to transport information among users or among points served by the system. One way to maximize the usefulness of a communications system is to facilitate the establishment of communications among users of the system. As one party seeks to communicate with another party, this may involve assisting in obtaining contact information for a given user or destination, or providing a variety of methods by which communication may be arranged.

For example, in a telephone network, a large proportion of calls are completed by direct dialing from one telephone to another. However, further effectiveness is achieved by the offering of interactive operator services or "enhanced services" to facilitate communications among parties. In some cases, enhanced services may be provided to help a caller by locating a telephone number for a called party or by connecting the caller to the called party. An enhanced service may also allow a caller to exercise a broad range of billing arrangements, such as calling card billing, billing to subscriber account numbers and collect calling.

To access an enhanced service in a telephony network, a caller may dial a telephone number such as '0' for an operator or '1-800-COLLECT'™ to reach a collect call platform or yet another number to reach a prepaid calling card platform. Through interaction with an automated VRU or a human operator in an enhanced services call processing platform, the caller typically provides information by voice or by in-band DTMF tones to convey the nature of service desired, to specify a called party, and to pass along information relevant to billing and authentication.

The offering of enhanced services is beneficial to a commercial service provider at least because increased call completion leads to increased billable usage of the system. The service provider may also seek to offer differentiating services to attract business or realize an additional revenue by charging fees for the use of such services.

Especially with the advent of newer types of communication, further measures are required to enhance the effectiveness of a communication system as parties seek to communicate with one another. In particular, it is desirable to maximize the ease with which one party is able to communicate with another party through whatever means are available. For a variety of reasons, a called party may not be reachable at a particular telephone number or may simply prefer to engage in other modes of communication rather than by phone.

SUMMARY

The present invention addresses the need to increase the flexibility and ease with which parties may establish communications. As will be described, the present invention achieves advantages in establishing communications despite the increased use of multiple, and often disparate, modes of communication such as telephony and instant messaging.

One aspect of the present invention relates to a method and system of processing a telephone call to a called party, in which a telephone call originated by a calling party from a telephone is received, and the telephone call to the called party is completed via a text-based instant messaging session. This may be especially desirable to parties already engaged in voice communications with others but who are willing and able to simultaneously carry on text chat communications. This capability may also increase completion of calls to parties who do not have voice-enabled messaging clients and audio hardware.

Another aspect of the present invention involves a method of processing a telephone call to a called party, in which a telephone call originated by a calling party is received, a presence identifier of the called party is obtained, and then the telephone call is coupled for interactive communications with the called party based on the presence identifier. Examples of the presence identifier include: screen name, an alias, a handle, an electronic pseudonym, a chat identifier, an address of some nature, and an instant message identifier. The presence identifier is a handle that can be used to query a server for determining a communications state of the called party, indicating at least whether the called party is available to accept delivery of instant communications.

In various embodiments, the presence identifier may correspond to any type of identifier associated with the called party and can be obtained, for example, by prompting the calling party for the presence identifier and receiving the presence identifier over the telephone call. Alternatively, the caller may provide a telephone number, e-mail address or other identifier of the called party, whereupon a database may be consulted to obtain a presence identifier corresponding to the identifier provided by the caller.

Yet another aspect of the present invention pertains to a method and system for completing a telephone call to a called party, in which a telephone call originated by a calling party is received and, after determining that the called party is online and available for accepting delivery of instant communications, an instant communication session is initiated between the calling party and the called party. The instant communication session can be any session in which messages are delivered at a rate capable of supporting an interactive session, such as a chat session, a voice-enabled chat session, an instant messaging session, an Internet Relay Chat session, and setting up a Voice-over-IP (VoIP) session between the calling party and the called party.

Still another aspect of the present invention includes a method of processing a telephone call to a called party, comprising: receiving a telephone call originated by a calling party; obtaining a telephone number of the called party; and attempting to reach the called party at the telephone number. If the called party is not reached at the telephone number, then the method includes: obtaining a presence identifier corresponding to the called party; and connecting the telephone call to the called party via an instant communications client based on the presence identifier.

In other aspects of embodiments of the invention, human or automated relay services for deaf, blind and people with other forms of disabilities can be provided to augment and provide additional service offerings and telecommunications services for people with disabilities. For example, when a called party is accessible only by textual chat, a blind person wanting to communicate with the called party via chat must find another party willing to help with the communication or seek out a computer workstation or the like equipped with a chat client and speech synthesis capabilities. Implementations of the present invention allow a blind person to use any telephone connected to the traditional public telephone network to interact with another party who is at that time available on, or using, a textual-based instant messaging system. This capability may be provided without requiring or burdening relay systems that are used by the deaf to perform textual communications. In some aspects, the invention can significantly simplify the ability of such users to participate in new and emerging forms of instant communications.

In another aspect, embodiments of the present invention can be integrated with billing services to provide a flexible arrangement for charging and recovering costs of providing instant messaging services.

An exemplary embodiment of the present invention sets forth, in a communication system, a device acting to establish communications. The device comprises a telephony interface acting to communicate with a first party via a telephone call, a interactive response station acting to conduct an interactive session with the first party via the telephone call, a presence interface acting to obtain presence information pertaining to a second party, and a bearer channel interface operably coupled to an instant communications client associated with the second party, the bearer channel interface acting to establish communications between the first and second parties responsive to at least one of the interactive session and the presence information.

Another exemplary embodiment of the present invention sets forth, in a communication system, a device operable to establish communications. The device comprises telephony interface means for communicating with a first party via a telephone call, interactive response means for conducting an interactive session with the first party via the telephone call, presence determining means for obtaining presence information pertaining to a second party, and bearer channel interface means operably coupled to an instant communications client associated with the second party, wherein the bearer channel interface means establishes communications between the first and second parties responsive to at least one of the interactive session and the presence information.

In yet another exemplary embodiment of the present invention a voice processing system is set forth for providing service to parties in a communications system. The voice processing system comprises means for receiving, from a first party using a telephone device, a request to establish communications with a second party, means for obtaining, from a presence-determining element, presence information related to the availability of the second party to engage in communications wherein the presence information is already maintained in the presence-determining element before the receiving the request, and means for responding to the request to establish communications with the second party responsive at least to the presence information.

In another exemplary embodiment of the present invention, a method is set forth for providing service in a communications system. The method comprises, from a first party using a telephone device, a request to establish communications with a second party is received. Next, from a presence-determining element, presence information related to the availability of the second party to engage in communications is obtained, wherein the presence information is already maintained in the presence-determining element before the receiving the request. Next, the request to establish communications with the second party is responded to, responsive at least to the presence information.

Another exemplary embodiment of the present invention sets forth, a computer-readable medium comprising instructions which, when executed by a processor, perform a method of providing service to parties in a communications system. The method comprises receiving, from a first party using a telephone device, a request to establish communications with a second party, obtaining, from a presence-determining element, presence information related to the availability of the second party to engage in communications wherein the presence information is already maintained in the presence-determining element before the receiving the request, and responding to the request to establish communications with the second party responsive at least to the presence information.

Another exemplary embodiment of the present invention sets forth a voice processing system for providing service to parties in a communications system. The voice processing system comprising means for receiving, from a first party using a telephone device, a request to establish communications with a second party, means for obtaining, from a presence-determining element, presence information related to the availability of the second party to engage in communications using an instant communications client, and means for responding to the request to establish communications with the second party responsive at least to the presence information.

Yet another exemplary embodiment of the present invention sets forth a method of providing service in a communications system. The method comprising receiving a request from a first party using a telephone device to establish communications with a second party, obtaining presence information, from a presence-determining element, related to the availability of the second party to engage in communications using an instant communications client, and responding to the request to establish communications with the second party responsive at least to the presence information.

Another exemplary embodiment of the present invention sets forth a computer-readable medium comprising instructions which, when executed by a processor, perform a method for providing service to parties in a communications system. The method comprises receiving, from a first party using a telephone device, a request to establish communications with a second party, obtaining, from a presence-determining element, presence information related to the availability of the second party to engage in communications using an instant communications client, and responding to the request to establish communications with the second party responsive at least to the presence information.

Still other aspects, features, and advantages of the present invention will be readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 9A-9D depict a process by which an unanswered call may be handled by an enhanced services system to offer a caller an option of communicating to a messaging client of a called party in accordance with an exemplary embodiment of the present invention.

DETAILED DESCRIPTION OF AN EXEMPLARY EMBODIMENT

Figure 1:
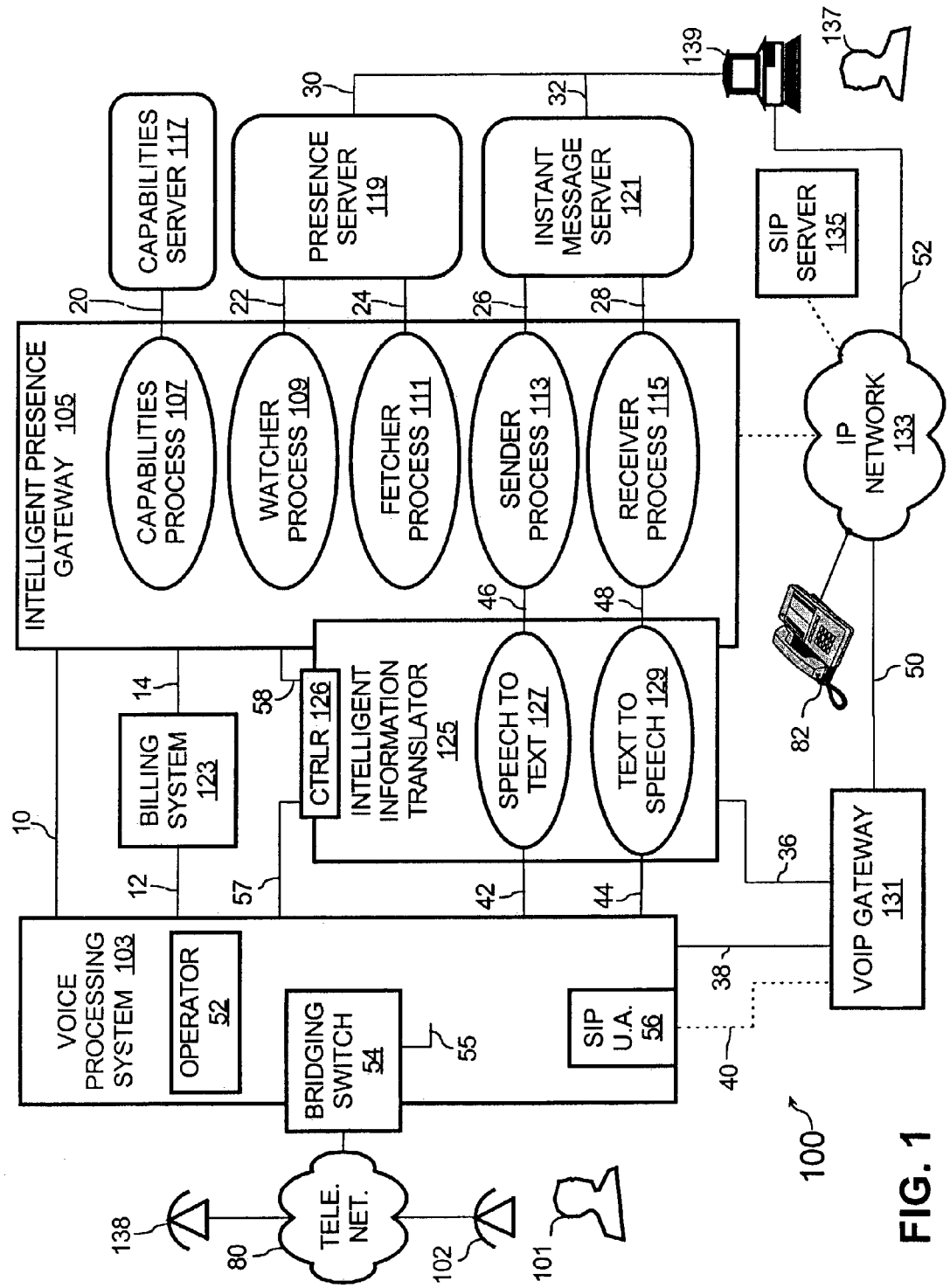
FIG. 1 depicts a communication network in accordance with one embodiment of the present invention.

Systems, methods and computer-implemented processes for call processing are described. In the following description, for the purposes of explanation, numerous specific details are set forth in order to provide a thorough understanding of the present invention. It is apparent, however, to one skilled in the art that the present invention may be practiced without these specific details or with an alternative equivalent arrangement. In other instances, well-known structures and devices are shown in block diagram form in order to avoid unnecessarily obscuring the present invention.

The present invention addresses the need to increase the flexibility and ease with which parties may establish communications. As will now be described using several exemplary embodiments, the present invention achieves advantages in establishing communications despite the increased use of multiple, and often disparate, modes of communication such as telephony and instant messaging.

An alternative form of communications popularized in recent years is messaging communications. Messaging communications are generally characterized by a communicating party determining a finite amount of information to be sent as a message. Messaging communications typically involve one or more discrete messages sent by a party to one or more other parties. A message may comprise text, data or digitized audio or video information, for example, or even combinations of these. Electronic mail (e-mail) and text paging are forms of messaging communications.

In contrast to messaging, other forms of communications, such as telephony, enable a period of essentially continuous (and usually full duplex) two-way conversation between parties in the context of a single session or connection. As in the example of telephony, the parties generally only determine the time duration of the overall session and are not engaged in composing and sending messages of a specific size.

'Instant messaging' refers to messaging communications wherein the delays in readying the message for delivery (such as addressing to a recipient), transporting the message, and bringing the message to the attention of the recipient are sufficiently short or imperceptible that parties may communicate in a nearly conversational manner. In the case of a form of instant communications known as 'text chat' sessions, the conversational pace is often limited mainly by the time it takes for chat participants to compose and finalize messages to be transmitted. The acceptable margin of delay in message transmission may be on a different scale than for the end-to-end delay margins in telephone communications, but the objectionable impact of excess delay on perceived fluency of communications is a common detriment to both modes of communication.

Instant messaging may be considered a type of instant communications. Some popular applications that are commonly used for instant messaging include, for example, America Online (AOL) Instant Messenger™ (hereinafter AIM), Yahoo!® Messenger and MSN® Messenger. The present invention is not limited to embodiments using these specific applications, technologies or services and maybe applied in the context of private or semi-private messaging systems such as a system used within an enterprise, company, or otherwise isolated or segregated user community.

In one sense, 'instant communications' may refer to a style of communicating wherein the communicating parties experience substantially immediate establishment of communications on a per-message basis. In the context of instant messaging, a selection may be initially made by a first party to open a dialog with a specific second party. Thereafter, the parties may spontaneously generate and send messages without having to address each message or perform other steps preparatory to the sending of each message.

Furthermore, the term "instant communications" may be applicable in the sense of there being no user-perceivable session establishment as each message is sent, even though each message is in fact sent as a brief burst of information transmission activity through the network. At some level, each transmission burst may be handled as a separate communications session.

The user does not have to engage in per-message establishment of a session, if applicable, nor is any significant delay perceived by the user arising from automatic session initiation that might be briefly performed at some level through, for example, a TCP/IP connection. In one regard, then, the instancy of instant communications may be viewed as relating to the performance of session initiation and addressing without burdening the user and with sufficiently little delay as to be minimally perceptible or inconsequential to the user.

Instant communications may also be 'instant' in the sense that, when a message is composed and sent, it is fairly immediately routed to a destination, such as an instant messaging client. As a message is composed and sent, the sending party may be provided with some indication that the destination is ready to receive messages or at least has recently claimed to be open to receiving messages. This forehand knowledge may be provided by presence technology described below. Except for very brief queueing in data buffers in routers and transmission equipment in the course of transmission, the message is not substantially stored anywhere in the network for the purpose of being delivered to the recipient at a later time or at a time determined by the recipient.

This instantaneous handling of messages may be contrasted to a typical e-mail system, wherein a message is often stored in a repository for a significant time period waiting for the recipient mail client application to poll for new mail items to download from the mail server. An electronic mail message may be stored on an e-mail server for a time duration of less than a minute or for several hours, several days or even indefinitely.

After polling a mail server and downloading any new messages, an e-mail client typically terminates communication with the mail server until a future time when the mail client again polls the server. The polling may be triggered by a time interval setting or by manual request from a user. Between such polling times, the mail server or service merely stores messages.

Another characteristic typical of instant communications is immediate presentation of the message content to the receiving party upon arrival of the message. A message received by an instant messaging client is immediately presented, such as in a window in a graphical user interface on a display device, or otherwise made known to the receiving party. The user is not required to take any action to receive or initiate delivery of each message that arrives. Message reception and presentation is automatic and immediate.

In contrast to electronic mail clients, it is generally unnecessary in instant communications for the user to poll a server either manually or automatically at certain time intervals, nor is the user require to take additional action, as there is with "opening" an e-mail, to have the content displayed. Furthermore, unlike an e-mail 'inbox' stored as a file in a nonvolatile storage device, there is typically no systematic storing of the received message at the receiving end for the purpose of presenting the message to the recipient for the first time at a time substantially later than it was received.

Instant communications may refer to any communications involving an instant communications client, such as an instant messaging client application running on a computer. An instant communications client may be an embedded application as embodied in a personal digital assistant (PDA), mobile phone or other portable device. An instant communications client may support instant messaging, such as text-based chat. An instant communications client may also support audio communications having little enough delay to enable interaction among communicating parties in a nearly conversational style. As a mode of communication, instant communications may be contrasted to toll-quality telephony, which provides full-duplex communications with any transmission delay being mostly attributable to propagation (at electronic speeds) and to vocoder signal processing delays. Users of text messaging and voice-enabled instant communications clients in conjunction with data transport networks may experience greater delays or less reliable transport than by a telephony mode of communication. Nevertheless, many users find instant communications to be adequate, more cost effective, and even preferable to more traditional telephony in some circumstances. The 'instant' quality of such communications achieves much more of a real-time interactive nature than paging or e-mail modes of communication.

An instant communications client may further enhance this communications by including or being coupled with technology that conveys the capabilities, personality, intent or other meaningful characteristics of the communications user. For example conversion of text into speech which reflects age, gender, language, accents, dialects and conversely converting speech into text or graphics that may also represent the same types of attributes.

In many implementations, instant communication is complemented by "presence" technology—a mechanism through which parties receive timely information about the availability of others to communicate. A presence service acts as an intermediary through which a party may express availability to communicate and may be informed about the availability of other parties. A description of presence technology may be found in document RFC 2778 of the Internet Engineering Task Force (IETF).

Presence technology facilitates instant messaging and supports the perceived instantaneous nature thereof. Indeed, one of the key motivations for applying presence techniques in the context of instant messaging is that, as described above, there is typically very little storage of messages for later delivery to a recipient. Consequently, it is often useful for a sending party to know, before assembling and sending messages, whether the messages are likely to be received or presented to the recipient in a timely manner. In the experience of the sending party, presence technology can be a factor affecting one's expectation or perception of instancy. To a party intending to send a message, presence technology attempts to provide awareness of the availability status of the intended recipient (or at least the readiness state of the recipient's instant communications client) before communications are sent to the recipient. When a sending party does observe or otherwise determine that a recipient is present via presence technology, the party may then confidently send communications and reasonably expect that the transmitting and presenting the message to the recipient will be immediate or nearly instantaneous. Presence differs from, for example, the placing of a collect call in that presence information for a party is often maintained before the time it is actually needed in the context of someone communicating with the party.

In general, presence technology is intended to provide an up-to-date indication of the presence of other parties. Of course, availability information for a party may be subject to change and to the party's desire to accept communications. The timeliness of availability information may also vary depending on implementation. A prospective sender of communications usually does not need to perform additional actions to ascertain presence of other parties at any point in time, such as immediately before sending a message. Instead, as in many instant messaging client applications, presence state of a group of addressees is constantly updated and indicated on a user interface. This self-updating aspect of some presence implementations further lends to the instancy and spontaneity with which users may initiate and carry on instant communications.

In the present description, a first party or user originating communications may be referred to as a "caller" or "calling party." Likewise, a second party being sought by the first party may be referred to as a "called party." For convenience, this familiar terminology is borrowed from traditional telephony. However, it should be understood that the present invention is applicable in the context of other communications systems and the use of these terms should not imply that it is constrained to conventional telephony in any way. A telephone network is but one type of communication system wherein enhanced services may be applied to increase the overall usefulness and effectiveness of service provided. It will be appreciated that the principles of the present invention may be usefully applied in other contexts.

In accordance with an exemplary embodiment, the present invention enables, as an alternative form of communication, the establishment of communications between a caller who is using a telephone and a called party who is using an instant communications client, such as an instant messaging client.

In accordance with a first exemplary usage scenario, the caller may contact an enhanced services platform by phone and express a desire to reach a particular party. By virtue of various aspects of the present invention, the enhanced services platform is able to offer the caller the option of communicating to the called party via voice communications or textual messaging through the called party's instant communications client. An example of voice communications to an instant communication client is depicted in a commonly owned patent application, U.S. application Ser. No. 09/858,256, which is hereby incorporated by reference in its entirety. In the latter case of textual messaging, speech-to-text and text-to-speech translating processes may be provided so that the caller's speech can be translated into a textual instant message that is sent to the called party and an instant message sent from the called party can be translated into synthesized speech. This function can also be provided by a human operator, creating, in essence, a human relay.

In accordance with a second exemplary usage scenario, the caller may contact the enhanced services platform by dialing a specific telephone number, such as '1-800-GET-CHAT', to signify the intent to contact a called party's instant communications client in preference to other alternatives that may be available at the time of the call.

In accordance with a third exemplary usage scenario, the caller may attempt a telephone call to a called party by dialing the called party's telephone number in the traditional manner. Upon recognition by some element of the telephone system or the enhanced services system that the call is busy or is unanswered, the caller may be connected to the enhanced services platform. The enhanced services platform may offer the caller alternative ways of reaching the called party, including textual messaging or voice communications with the instant communications client of the called party as enabled by aspects of the present invention.

In accordance with an exemplary embodiment of the present invention, presence-determining aspects of instant communications technology are advantageously employed by an enhanced services platform to further improve the usefulness of the service provided. In the course of assisting a calling party seeking to initiate communications with a called party, the enhanced services platform may ascertain the current availability or a "presence state" indicating whether the called party is available to communicate via an instant communications client. In the various usage scenarios described above, the presence information is used by the enhanced services platform to determine, for example, whether to offer instant communications as an alternative to a caller.

In addition to providing flexibility in how communications are established, it is also desirable to maximize the convenience and usefulness of a commercial communications service by offering a wide variety of payment arrangements. For example, by allowing billing to a credit card or similar impromptu arrangements, a service provider may advantageously accept business even from users who are not subscribers to the service. This allows for casual access by the general public and provides revenue opportunities beyond formal pre-subscribed or prepaid arrangements, while also increasing the effectiveness and usefulness of the publicly available communications system or a private communications system.

Some aspects of the present invention also advantageously allow for efficiency in the use of 'numbering' (as in telephone networks) or other types of address space resources in a communications system, as well as flexibility in how a called party is specified.

This consideration of numbering space in telephone networks is of growing importance. Traditional numbering plans applied to telephony, such as the North American Numbering Plan, were initially structured based on geographical location and the need to achieve automatic routing of calls among switches in the early telephone network. More recently, the inevitable exhaust of the all of the available numbers according to this plan has been accelerated by the increase in users requiring multiple telephone numbers and multiple telephone lines. For a given telephone subscriber, these multiple numbers or lines often include both home and business telephones, facsimile machines, wireless phones and separate dial-up modem connections.

Accordingly, it is advantageous in one aspect to provide a single identifier corresponding to a given user, whereby contact made using the single identifier, such as a single telephone number, provides access to several modes of communications and perhaps several alternative locations at which the user may be reached. For similar reasons, it is further desirable to implement a communications system wherein identifiers other than, or in addition to, a conventionally structured telephone number may be used to specify a desired called party. This measure dramatically increases the 'address space' from which to select identifiers. Where a communications system is accessed directly by human users, it may also be advantageous to employ identifiers that are of a textual or spoken nature, rather than numbers, that are more akin to natural language and are easier to mentally associate with a party.

Coupled with the issues above, it may be preferable to provide access to a service through a single address, telephone number or other form of identifier that is easy for users to remember and associate with the service. This practice may provide advantages in advertising and encouraging use of the service.

Finally, the combination of these practices essentially provides for a single number by which a vast number of called parties may be addressed and reached, with the further advantage that the called party addressing used within the system need not correspond to telephone numbers at all. Thus, one may view the teachings of the present invention as advantageously dealing with the telephony-related number exhaust problem in at least two ways.

In addition to the above measures, it may be desirable to employ a contact number or address such that the very act of the user accessing the service via the specific contact number signifies or implies to the service some aspect of how the user wants to be served. In accordance with a preferred exemplary embodiment of the present invention, the dialing of a predetermined telephone number signifies the caller's preference to initiate messaging communications as a preferred mode over other available modes.

In some instances, it may be desirable or advantageous to employ a system wherein a single called party may be known by multiple types of identifiers or aliases, perhaps so that parties wishing to reach the called party may employ whichever handle or identifier is most convenient. In a suitable embodiment, a caller may be able to use any of a variety of identifiers, aliases or addresses to specify the party they are trying to contact. Some examples of identifiers for a party include name, street address, telephone number, e-mail address, chat screen name, alias or 'handle', alphanumeric pattern, network address, uniform resource identifier (URI), uniform resource locator (URL), account number, spoken utterance, etc.

Taking the approach further, it is possible for a party to be associated with multiple aliases even of the same type. This may be useful from the standpoint of the called party being able to independently manage inbound "traffic" from various groups of originators. For example, a user may provide to casual acquaintances one alias for communication while giving close friends and family members a different alias to be used.

In the context of user aliases, it is particularly noteworthy that, in accordance with a preferred exemplary embodiment of the present invention, a party may be identified using an instant messaging 'screen name' or the like, perhaps in addition to other identifiers such as given name, telephone number or account number. A caller may specify a desired party by providing a screen name by which the called party is known in an instant messaging system. An enhanced services platform may comprehend the screen name and facilitate contacting the corresponding called party by instant messaging or other means.

These advantages and desirable features, as well as the exemplary usage scenarios mentioned above, may be realized and demonstrated in the system of FIG. 1 which will now be described.

Network Overview

FIG. 1 is a block diagram of a communications system 100 in which an exemplary embodiment of the present invention can be implemented. As illustrated, a calling party 101 is capable of communicating, such as by a telephone connection, with a voice processing system (VPS) 103 typically by dialing a telephone number using a telephone 102 via telephone network 80 in order to reach a called party telephone 138. Telephone network 80 may include, for example, the Public Switched Telephone Network (PSTN) to which VPS 103 is interfaced. However, the present invention is not limited to the use of telephones and the Public Switched Telephone Network by the calling party 101, because the calling party 101 may use other means to connect to the voice processing system, including mobile telephones, internet telephones, packet telephony clients, etc.

VPS 103 may be an interactive voice processing system that provides operator services, which can be performed manually by a human operator, automatically by interactive voice response (IVR) implemented by computer processing in a telephony server, or by a combination of manual and automatic interaction. Both types of interactive respondent are represented in FIG. 1 by operator 52. Typically, a VPS 103 will comprise a plurality of operator stations or 'interactive response stations'. Traditional examples of operator services are directory assistance and operator-assisted call placement. In the course of providing various types of operator services, VPS 103 may elicit information from calling party 101, furnish confirmation or prompting to calling party 101, and provide information to calling party 101. In fulfillment of some services, voice processing system 103 may also control, or at least initiate, the completion of a call from calling party 101 to called party 137. The call may be completed in accordance with the information provided directly by the calling party 101 or obtained from various databases, such as directories (not shown), accessible to the voice processing system 103 based on information from the calling party 101.

In accordance with a typical usage scenario, calling party 101 uses a telephone 102 to establish contact with a called party 137. In the case of, for example, a collect call, a calling card call or a operator-assisted call, calling party 101 may contact VPS 103 as an intermediary to establish the call. Calling party 101 may know the telephone number of a called party telephone 138 associated with called party 137 and may want to arrange alternate billing through VPS 103 rather than call phone 138 directly. Otherwise, calling party 101 may not know the telephone number of phone 138 and may have operator 52 assist in finding the telephone number. Called party 137 may be accessible via called party client 139 rather than phone 138 and, in accordance with an advantageous aspect of the present invention as will be shown, VPS 103 may assist the calling party 101 in making contact with the called party 137 despite this situation.

For practical reasons, VPS 103 is often coupled to telephone network 80 through a bridging switch 54. Bridging switch 54 allows an operator 52 to establish a call among parties in a telephone network and then be removed from the call. Thereafter, the connection among the parties is maintained by the action of bridging switch 54 even after the operator is released. This avoids burdening the VPS resources with having to maintain the connection for the duration of the call. To achieve this advantage, a special type of trunk, known as a release link trunk 55, is used between bridging switch 54 and VPS 103. This arrangement using a bridging switch is well-known among those of ordinary skill in the art and is described, for example, in U.S. Pat. No. 5,787,150.

Bridging switch 54 may be considered to be separate from or integrated with VPS 103. In practice, bridging switch 54 is often physically separate from VPS 103 yet bridging switch 54 is often owned by or controlled by the entity that owns and controls VPS 103, so bridging switch 54 may be regarded by some, in a sense, to be part of the service providing system of VPS 103.

In accordance with various embodiments of the present invention, information accessible to voice processing system 103 or provided by calling party 101 may include the telephone number associated with called party 137 (that of telephone 138) or a presence identifier for called party 137. A presence identifier is a symbolic identifier associated with the party and referring to the party. The presence identifier can be used in querying a server (referred to as a "presence server") or other form of presence-determining process for determining a communications state of the party. The communications state, or "presence state", indicates at least whether or not the party is available to accept delivery of preferably instant communications. Examples of instant communications include instant messages, chat messages, voice-enabled chat, internet relay chat (IRC), voice over Internet Protocol (IP), and any other messages delivered at a rate capable of supporting an interactive session. In contrast to the store-and-forward approach of electronic mail, the delivery of these types of instant communications is substantially immediate, enabling parties to communicate in a nearly conversational style and pace. Accordingly, a presence identifier can include any of a screen name, a handle, an alias, an electronic pseudonym, a logical or physical address of some nature, a chat identifier, and an instant message identifier.

VPS 103 is coupled, via connection 10, to an intelligent presence gateway (IPG) 105 for handling the presence-related processing of the call from the calling party 101. Connection 10 may be implemented as an interface coupling VPS 103 and IPG 105 using a mutually understood protocol. In this manner, VPS 103 and IPG 105 may be manufactured separately yet properly interoperate when connected together in a working installation. As used herein, an 'interface' refers to a coupling through which entities engage in some form of interaction, such as the communicating of information from one to another. From the standpoint of IPG 105, connection 10 may be indicative of a voice processing system interface for passing control information. Likewise, with respect to VPS 103, this interface to IPG 105 may be regarded as a presence interface by which VPS 103 may receive presence information and other control information. Along connection 10, voice processing system 103 may request and obtain a communications state for called party 137 from IPG 105. As part of a request, voice processing system 103 may specify a particular called party 137 by using a presence identifier associated with called party 137, if known, or by using a telephone number or other index adequately specifying called party 137. Alternatively, voice processing system 103 may obtain a presence identifier for called party 137 from IPG 105 in response to a request specifying the called party 137 by other means, such as by a telephone number.

The intelligent presence gateway 105 can be implemented by a computer system executing one or more processes relating to specific aspects of presence-based call processing. These processes may include a capabilities process 107, a watcher process 109, a fetcher process 111, a sender process 113, and a receiver process 115. Although all of these components are labeled and illustrated in FIG. 1 as separate processes, this separation is merely functional. The present invention is not limited to implementing each of the logical processes as separate physical processes, and the illustrated processes may be combined into one or more larger processes or implemented by threads or other forms of procedural control flows. Each function represented by processes 107 through 115 may also be distributed among multiple instances and multiple physical computing systems in a manner well understood by those of ordinary skill in the art.

As one form of capabilities-determining process, capabilities process 107 can be provided to query a capabilities server 117 for determining what kinds of communications the called party 137, or more particularly called party client 139, can handle. Capabilities process 107 may be communicably linked, via connection 20, to a capabilities server 117 or capabilities process 107 may subsume the function of capabilities server 117. For example, the capabilities server 117 may be a subscriber database that includes attributes—and information such as a previously registered presence identifier for the subscriber and which kinds of communication means the subscriber has for accepting instant messages, voice-enabled chat messages, voice-over-IP communications, and the like. The capabilities server 117 may also store this information in association with the subscriber's telephone number so that the operator services of the voice processing system 103 can obtain the presence identifier of a subscriber based on the telephone number of the called party 137. Capabilities server 117 may also express preferences on behalf of called party 137, such as preferred modes of communications that should be attempted before other modes.

Both the watcher process 109 and the fetcher process 111 are configured for obtaining presence information, including the communications state of the called party 137, from a presence server 119 via connections 22 and 24. A presence server 119 is preferably implemented as a computer system that furnishes the presence services described in Internet Engineering Task Force (IETF) document RFC-2778 or similar specifications. Examples of publicly or commercially available instant messaging services providing presence functionality include AMERICA ON-LINE™, YAHOO™, etc. Alternatively, presence server 119, instant messaging server 121 and called party client 139 may represent elements of proprietary, private or semi-private messaging systems which, for example, are operated within a business enterprise or organization. Typically, users make their on-line presence known by registering their communication state with the presence server 119. Specifically, when a user logs in using a messaging client somewhere on the Internet, corporate intranets, or other similar networks, the user effectively registers with the presence server 119 that the user is available, and when the user logs out, the user registers with the presence server 119 that the user is unavailable.

In FIG. 1, called party client 139 represents a communications device, such as a computing device running a communications application, wherein an instant communications client of this type may operate. Called party client 139 may be communicably coupled to instant messaging server 121 via connection 32 and may be communicably coupled to presence server 30 via connection 30.

Connections 30 and 32 may be realized through a data transport network, such as the Internet, and need not be permanent or persistent connections. Connections 30 and 32 may be implemented through network 133, which may be the public Internet or an intranet or some other form of network.

Fetcher process 111 is configured to query the presence server 119 for the communications state of a specific called party 137 as referenced by a given presence identifier. Accordingly, the fetcher process 111 can be used to obtain the communication state of a called party 137 who may or may not be pre-subscribed to the operator services of the voice processing system 103. If, for implementation-dependent reasons, it is not desirable to maintain a list of subscribers by the watcher process 109, the fetcher process 111 can be used to obtain the communication state of the called party 137 as needed, whether or not the intelligent presence gateway 105 or a system accessible to the intelligent presence gateway 105 has prior knowledge of the called party 137.

As an alternative to fetcher process 111, which obtains presence information as needed, a watcher process 109 may be used to obtain notifications from presence server 119. Watcher process 109 may submit a list of presence identifiers of subscribers to the presence server 119. For example, these subscribers may be pre-subscribed customers of the company that provides the enhanced services, e.g. the company providing the operator services at the voice processing system 103. After receiving the list of parties of interest to watcher process 109, presence server 119 notifies watcher process 109 of any changes in communication state for the listed parties. Consequently, the watcher process 109 is able to keep track of the latest communication state of any of the subscribers in the list and be prepared to provide such information to VPS 103. The watcher process 109 may also poll the presence server 119 for updates to the presence information in the list of presence identifiers.

Instant messaging server 121 is a form of instant messaging server (or service) facilitating messaging communications among parties. The sender process 113 and the receiver process 115 are configured for communicating with an instant messaging server 121 via connections 26 and 28, respectively. Specifically, the sender process 113 is configured to transmit messages to the instant messaging server 121, and the receiver process 115 is configured to receive messages from the instant messaging server 121. Multiple sender processes 113 and receiver processes 115 may be running on the intelligent presence gateway 105, each one being spawned for a particular corresponding enhanced services session. With respect to instant messaging server 121, IPG 105 may be indistinguishable in behavior from other instant messaging participants using the server. Sender process 113, receiver process 115 and connections 26 and 28 are indicative of an instant messaging interface for IPG 105 or other elements of FIG. 1.

Preferably, the instant messaging server 121 may be implemented as a computer system that furnishes the instant message services described in IETF document RFC-2778 or similar recommendations. Instant messaging server 121 may be private or publicly available and may be commercial or non-commercial. The role of instant messaging server 121 may be fulfilled by popular instant message services supplied by AMERICA ON-LINE™, YAHOO™, etc. As another example, the instant messaging server 121 can be a server that provides Internet Relay Chat (IRC). Preferably, the instant messaging server 121 is capable of both text-based messaging and voice-enabled messaging. Alternatively, in accordance with some implementations of instant messaging, instant messaging server 121 may only be involved in establishing initial contact among conversing parties, with subsequent messaging taking place directly between the parties, such as between called party client 139 and receiver process 115, without going through server 121. It is also feasible that the functions of instant messaging server 121 can be implemented by a computer system at the called party client 139 in what may be referred to as a peer-to-peer messaging system.

Both the intelligent presence gateway 105, via connection 14, and voice processing system 103, via connection 12, are coupled to a billing system 123 for recording service and session events that allow the enhanced services presence-based call completion to be charged on a per-call, per-message, per event, per minute, or other per-unit of time or data basis. Of course, services may also be provided on a subscription basis or at a flat rate, or even billed according to a combination of basic rates and usage-based charges. The billing system 123 may also be used by the voice processing system 103 to ascertain whether there are billing restrictions on the enhanced services, for example, to prevent fraudulent calls or calls using stolen credit cards, or to block certain types of calls such as those originating from a particular number or facility. The telephone network 80, VoIP Gateway 131, and IP Network 133 may also be coupled to the billing system 123.

Another component of the network 100 is an intelligent information translator (IIX) 125, which can be integrated with the intelligent presence gateway 105 or be implemented on a standalone server. The intelligent information translator 125 is applied for establishing communications among calling party 101 employing voice over telephone 102 and called party 137 who is using textual messaging via called party client 139. In some embodiments, the functions and components of the voice-over-IP gateway 131 or the voice processing system 103 may be integrated with the intelligent information translator 125.

Furthermore, the intelligent information translator 125, in response to interaction with the intelligent presence gateway 105, initiates and executes a speech-to-text process or thread 127 and a text-to-speech process or thread 129 for translating among speech signals associated with the telephone connection and textual information associated with the instant messaging session.

As used herein, "speech" may, in a broader sense, also include non-spoken audible signals such as tones, signals or sounds which have meaning or significance that is commonly recognized or at least mutually agreed upon among communicating parties. For example, sounds of laughter, musical tones, sound effects, DTMF signals or other familiar audible sounds may communicate information or express thoughts and emotions. Embodiments of the present invention may advantageously include various aspects of recognizing, interpreting, and producing such sounds as a way of enhancing communications among parties. One practical application of this might be allowing a user of the system that generates textual information to interact with a voice processing system that is accustomed to receiving DTMF tones as input.

In the discussion of IIX 125, "text" may refer to, for example, symbols, characters and representations of visual or tactile elements which may or may not be actual words according to a given written or spoken language. Thus, it should be understood that text-to-speech process 127 and speech-to-text process 129 may operate to convert to/from audible signals other than spoken words and to convert to/from data representing information other than words.

In the context of facilitating communications among one party using an instant communications client and another party using a telephonic connection, a novel aspect of the present teachings relates to the manner in which symbols, known as "emoticons" and often appearing along with textual information, may be used to convey emotions, thoughts or impressions.

Because instant messaging sessions, especially chat sessions, may use a number of conventional abbreviations and so-called "emoticons", the speech-to-text process 129 and text-to-speech process 127 may employ special-purpose dictionaries (not shown) that list the proper equivalents for performing conversion among speech and text or symbols. For example, the commonly used "LOL" may be translated to the spoken equivalent of "laughing out loud" or to a sound effect that sounds like laughter. Dictionaries may be customizable to suit the preferences of communicating parties using system 100.

IIX 125 may act to recognize sounds and render, in the conversion performed by speech-to-text process 129, textual or symbolic representations that correspond to the sounds according to some conventional or desired mapping. For example, the spoken words "laugh out loud" or even the detection of sounds of laughter from one party may evoke a textual "LOL" or the like which is conveyed to the other party who is using a textual interface. Further, to aid such detection or provide more deliberate control for communicating parties, IIX 125 may be receptive to verbal commands and command delimiters indicating that a sound or spoken utterance is to be interpreted according to this feature rather than interpreted as literal words. For example, a party may say "insert" or "emoticon" followed by a desired expression such as "laugh", "frown", "puzzled", etc. Upon recognizing such a keyword, IIX 125 will interpret adjacent sounds and, if possible, map the sounds detected into appropriate symbols to be sent to another party.

In performing conversion, IIX 125 may be receptive to other signals such as DTMF signals. While communicating through IIX 125, a party using a telephone may be able to press digits on a dialing keypad to have specific emoticons or other symbols included in the textual output of the conversion module. For example, a "smiley face" representation may be sent to an instant communications user in response to a telephony user entering a sequence such as "#8" or "486", the latter of which follows the shape of a smile on a standard 12-key touch-tone keypad. DTMF tones may also be used to implement recognizable command delimiters in the context of the previous discussion.

In the course of converting speech and other audible signals into corresponding symbols or text, IIX 125 may also perform translation among different spoken and written languages, for example, converting English text to Spanish speech and vice-versa. The decision to invoke this type of conversion may be performed dynamically in response to input from the parties as the communications is established. Alternatively, language preferences or compatibilities of one or both of the parties may be known or maintained in a profile database or expressed by devices, such as called party client 139, to affect how IIX 125 handles the communications. Language conversion may be provided as an option to users and, from a commercial standpoint, may be offered at an additional charge to offset costs or provide a profitable operation for a service provider.

As IIX 125 performs conversion, the manner in which each party perceives the other party may be affected by the interaction through the translator. For example, a male party using an instant communications client, such as called party client 139, will likely prefer that any synthesized speech representing him to a telephony user be rendered in a male voice. Other aspects of speech rendering, such as approximate speaker age, vocal characteristics, inflection and local dialect may be alterable or configurable and may be adjusted dynamically or according to, for example, a profile maintained for a given user in capabilities server 117, for example. In some implementations, a party might elect to use a speech persona that is whimsical or that emulates the characteristics of a popular recognizable personality. Users may pay a premium to a service provider for the use of such custom services.

Another aspect of how one party "experiences" another party relates to the identifying of the parties to one another, particularly to the party who is using an instant communications client of some nature. In conducting messaging communications, for example, one party will see chat messages coming from another party, the chat messages having actually been composed by speech-to-text process 129 based upon speech input from the other party. The apparent screen name of the remote party may be subject to control dynamically during the establishing of communications or may be affected by a profile of user preferences consulted by system 10 in the course of providing the communications service. According to various implementations, the presentation of remote user identity to the messaging user may comprise a screen name, an image or iconic representation, a sound bite or other presentable element. The manner in which a given party wants to be presented to a remote party may be the subject of interaction with an operator or interactive service providing system during or preparatory to the establishment of communications involving the parties. A service provider may optionally assess billable charges to one or both of the parties related to the provisioning, use or invocation of some of these presentation features.

IIX 125 may be controlled by or communicably coupled to either or both of VPS 103, via connection 57, or IPG 105, via connection 58. The types of communications that may take place through these connections are typified in the discussion of FIG. 2B. One aspect of control information along connection 57 may relate to whether or not IIX 125 is to engage in communications involving called party client 139. Other aspects affected by communication along connection 57 may relate to, for example, port numbers by which other elements communicate with translating processes or language models to be used for translation. Alternatively, engagement of IIX 125 may take place intrinsically through communications along connections 42, 44, 46 or 48. IIX 125 may comprise a controller 126 for performing control communications, such as along connections 57 and 58, and generally for coordinating any necessary allocation, configuration or the like pertaining to engaging processes 127, 129 in communications sessions through IIX 125.

Responsive to whether the called party will be using textual messaging, IIX 125 may be invoked by coupling text input from receiver process 115 along connection 48 to text-to-speech process 127, which converts the text input to corresponding speech output and sends the speech output, along connection 44 to ultimately reach calling party 101. Likewise, speech input received from calling party 101 along connection 42 is converted by speech-to-text process 127 into corresponding text output and passed, along connection 46, to sender process 113 to ultimately reach called party client 139.

Connections 42 and 44 may be said to be a "bearer channel interface" referring to the bearing or carrying of user traffic as opposed to signaling and control information. Other elements in FIG. 1 may be similarly viewed as having bearer channel interfaces. Furthermore, although connections 42 and 44 are shown as coupled to VPS 103, it is conceivable that the coupling of connections 42 and 44 to calling party 101 may involve one or more of VPS 103, bridging switch 54 and telephone network 80. The nature of connections 42 and 44 may vary as well. Depending on the degree to which IIX 125 may be integrated with VPS 103, connections 42 and 44 may be implemented along a data bus or local area network which carries data representing voice signals within VPS 103.

Otherwise, connections 42 and 44 may resemble standard interfaces such as T1, ISDN PRI, or even analog 2-wire or 4-wire connections. Advantageously, connections 42 and 44 may be assigned to ports on the bridging switch 54 so that calling party 101 may be coupled to IIX 125 without occupying resources of VPS 103. Speech signals to be translated into textual information may reach IIX 125 in a variety of forms.

A signaling interface, such as SIP user agent 56, optionally added to voice processing system 103 is shown to in communication with a voice-over-IP gateway 131 for establishing a voice call over a packet-switching network, such as IP network 133, using a protocol such as Session Initiation Protocol (SIP) or H.323. The voice-over-IP gateway 131 may also be in communication, directly or through VPS 103 or other elements, with the intelligent information translator 125 for providing the voice input to the speech-to-text process 127 and receiving voice output from the text-to-speech process 129. Various couplings between voice-over-IP gateway 131 and other elements may be considered a packet voice communications interface with respect to system 100. Furthermore, where system 100 is taken to include a voice-over-packet gateway or otherwise provide an interface directly to a packet data network, the interface so formed may also be referred to as a packet voice communications interface.

Those of ordinary skill in the relevant art will recognize that the various functional elements depicted in FIG. 1 may be combined or separated in a variety of ways while still embodying the teachings of the present invention. For example, VPS 103 and IPG 105 may be separately implemented and merely interfaced to one another. Alternatively, these may be fully integrated in a single element or installation to constitute a device for enabling call completion through real-time messaging communications. Either of these may also include IIX 125 and its functions. Furthermore, a gateway device, such as VoIP gateway 131, may be integrated with any or all of these elements to form a composite device or system enabling communications among a telephone user and a instant communications client.

Any of the various possible combinations among elements may be implemented in a platform suitably equipped with telephony interface equipment, communications switches, operator stations, and sufficient computing and digital signal processing resources to provide all the requisite functionality and interfaces described herein. For example, an arrangement suitable for implementing at least VPS 103 and perhaps other elements of system 100 is described in the co-pending U.S. patent application Ser. No. 09/096,938, especially with respect to FIGS. 1 and 2 therein. Voice processing systems in general are well known in the art and it will be apparent to those of ordinary skill how a variety of existing systems and architectures may be modified in design to embody the present invention.

In addition to calls carried over a conventional telephone network 80, system 100 may also involve telephony class and other communications within a packet data network, such as IP (internet protocol) network 133. An IP telephone 82 is shown coupled to IP network 133 and may be used by a caller to originate a call to VPS 103. VPS 103 may handle such a call similarly to what has been described for a conventional telephone call inbound from telephone network 80.

One technique for coordinating the establishment of telephony calls and other types of communications sessions is called the Session Initiation Protocol (SIP) and is described in documents such as RFC 3261 of the Internet Engineering Task Force (IETF). IP telephone 82 may be a SIP-compliant device. To establish a connection with VPS 103, IP phone 82 may send a SIP 'INVITE' message to a SIP server 135, which serves a role in a SIP environment of determining how and where to send further SIP messages to achieve the connection requested from IP phone 82. Eventually, by the appropriate sequence of SIP messaging as is well known in the art, IP phone 82 may be connected to VPS 103 through a voice-over-packet gateway, such as voice-over-IP (VoIP) gateway 131. Connection 50 by which IP network 133 is coupled to VoIP gateway 131 may comprise SIP signaling messages over a User Datagram Protocol (UDP) and digitally encoded audio telephony signals sent via the Realtime Transport Protocol (RTP).

A voice-over-packet gateway, such as VoIP gateway 131, is well known in the industry as a device for allowing communications among disparate types of networks. In particular, VoIP gateway 131 adapts signaling and bearer channel communications in a telephone network to the types of signaling and packetized data stream communications used in a packet telephony network.

IP telephone 82 may be connected to VPS 103 through IP network 133 and VoIP gateway 131. A user of IP phone 82 may experience much the same interaction with operator 52 as calling party 101 or called party 137.

A user of IP phone 82 may be able to send and receive voice communications to IIX 125 in order to communicate with called party 137 who is using a textual messaging interface at called party client 139. In this scenario, the speech communications among the IP phone 82 and the IIX 125 may be carried along connection 38, which may be a conventional telephone circuit or TDM channel. Alternatively, VoIP gateway 131 may be coupled via connection 36 directly to IIX 125 to facilitate such communications. Any of connections 36, 38 and 40 may implement a gateway control interface operable to cause VoIP gateway 131 or the like to establish voice communications between a telephone 102 or IP phone 82 and called party client 139. It is also conceivable that IIX 125 may provide, for example, an interface directly to IP network 133 for directly supporting RTP connectivity. Additionally, any of connections 36, 38 and 40, as well as SIP user agent 56, may implement a network signaling interface operable to coordinate communications between parties in FIG. 1. Connections 36, 38 and 40 may also carry voice communications to and from network 133 and may therefore implement a packet voice communications interface.

Aside from being involved in the connection of IP phone 82 to VPS 103 just described, IP network 133 may participate in reaching called party client 139 by so-called "voice enabled chat." Upon indication that the called party client 139 supports voice connections and that such a voice connection is indeed desired by the communicating parties, a voice connection may be established from calling party 101, through VPS 103 or bridging switch 54, through connection 38, VoIP gateway 131, IP network 133 and connection 52 to called party client 139. The signal through connection 38 may be a conventional analog or TDM telephony signal whereas the latter segments through IP network 133 may be RTP connections through a packet data transport.

Those of ordinary skill will recognize that many variations are possible in connections among elements, sequencing and flow of control messages, roles fulfilled by elements, inclusion of SIP user agent clients and user agent server interfaces into elements. For example, VPS 103 may present an interface direct packet transport interface and/or a SIP interface without requiring gateway 131.

Furthermore, indications of activities or events within various elements of FIG. 1 may be reported to billing system 123 for purposes such as assessing usage charges to users, monitoring fraud activity or performing traffic engineering. These indications of activities or events may relate to a wide variety of events taking place within elements in FIG. 1 and may be designed to occur at any point in the course of providing a service to one or more parties. Indications to billing system 123 may accompany other communications, such as control communications occurring among elements in FIG. 1, and may reach billing system 123 via any number and combination of the connections and elements shown. Indications to billing system 123 may undergo processing, such as combining of related indications, by other elements before being forwarded to billing system 123. Some or all of the function of billing system 123 may be integrated into or distributed among other elements or functions depicted in FIG. 1. Any of the elements may be involved in also using billing system 123 verify whether service activity is to proceed based upon, for example, ability to obtain payment for providing the service.

Call Flows

Figure 2A:
FIGS. 2A and 2B together depict a call-flow diagram of a presence-based call completion session with calling party termination in accordance with one embodiment of the present invention.
Figure 2B:
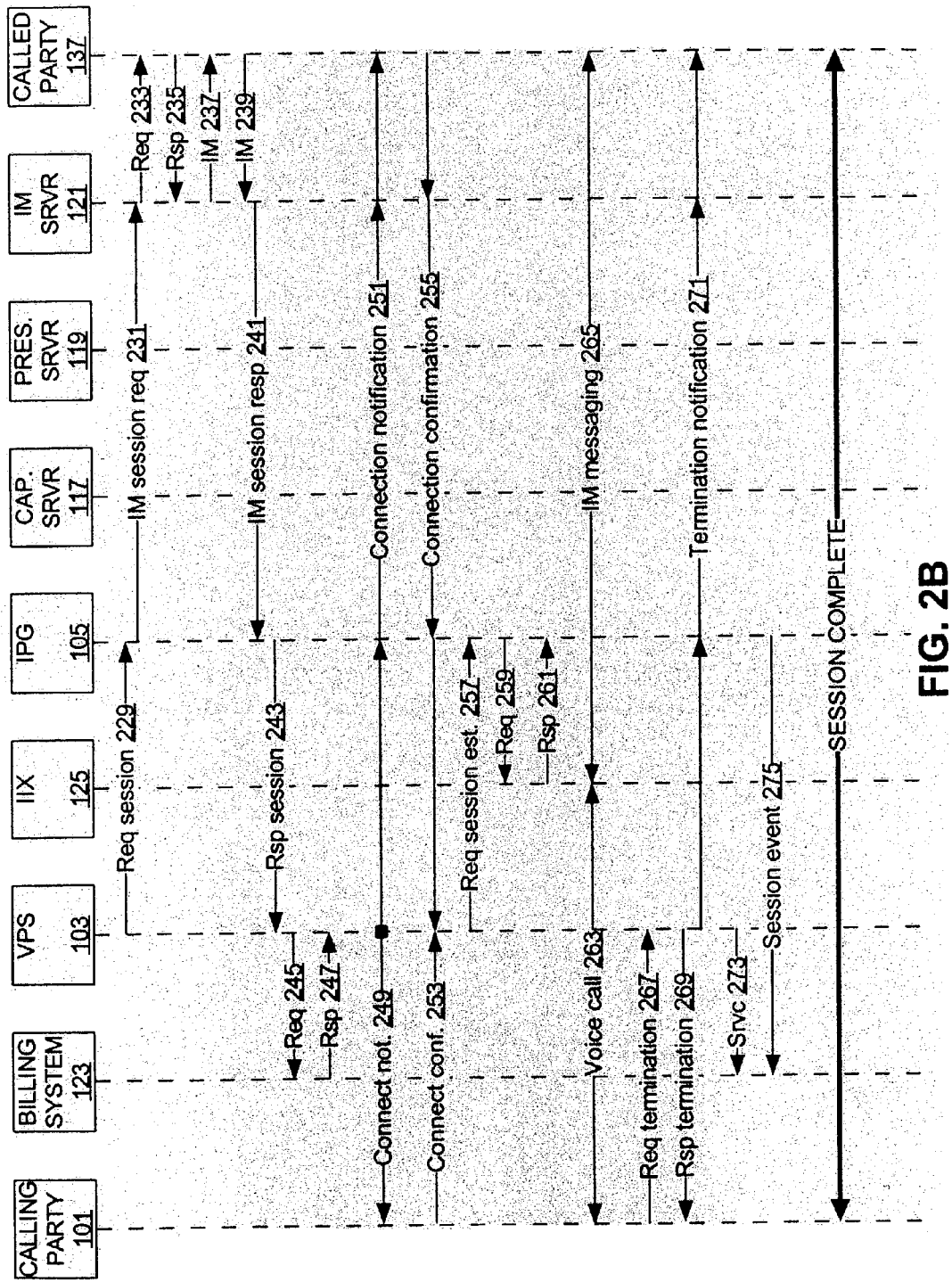

Various call completion scenarios can occur within the network illustrated in FIG. 1. FIGS. 2A through 5B are various example call flows depicting how elements of FIG. 1 may interact to handle a call in various ways. The four call flows are similar in many ways but differ in the following aspects:

FIGS. 2A and 2B describe what may occur as a calling party makes contact with VPS 103 and is connected to the called party's instant communications client through IIX 125. After communicating in this manner for a period of time, the caller eventually disconnects the call.

Figure 3A:
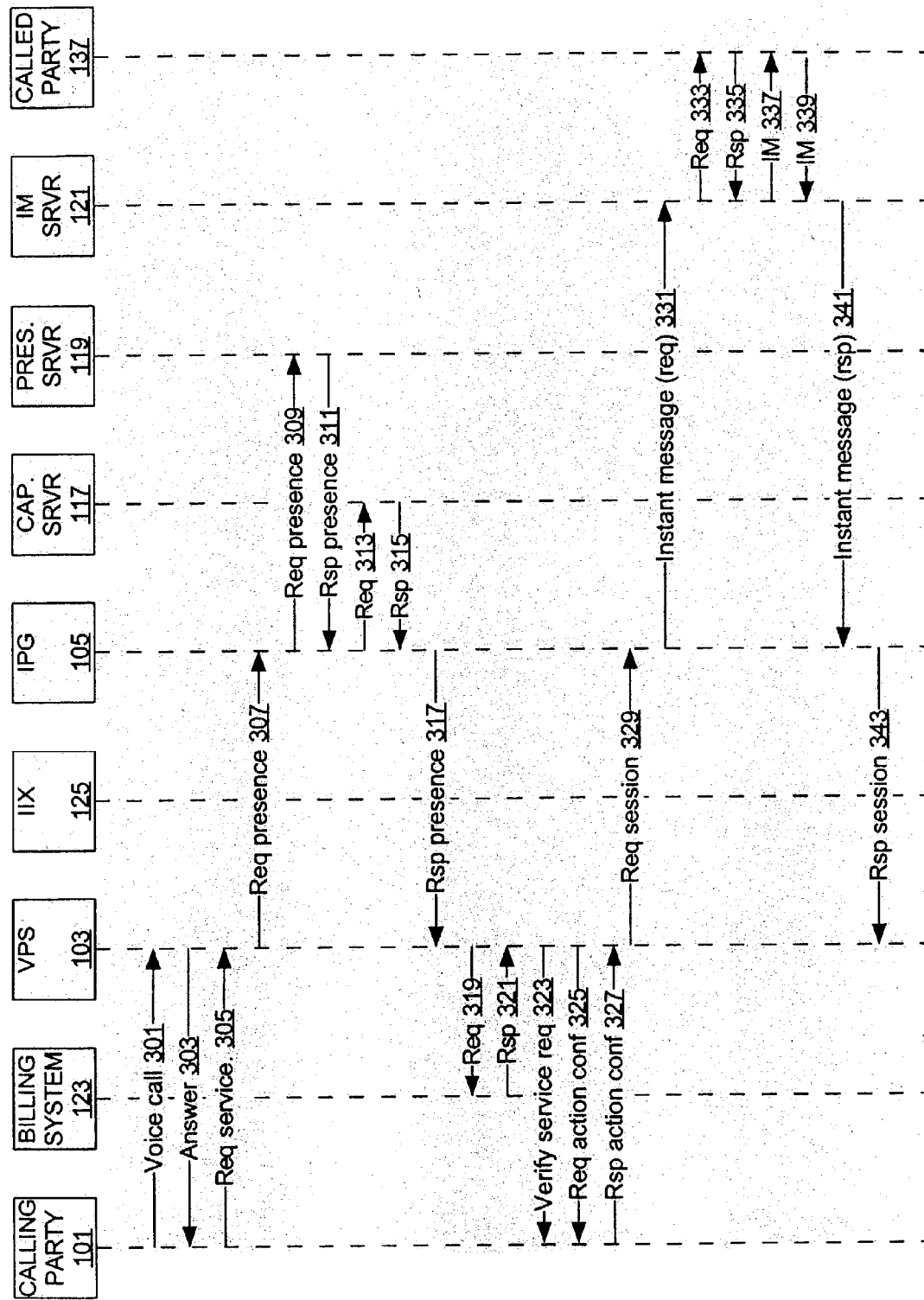
FIGS. 3A and 3B together depict a call-flow diagram of a presence-based call completion session with called party termination in accordance with one embodiment of the present invention.
Figure 3B:
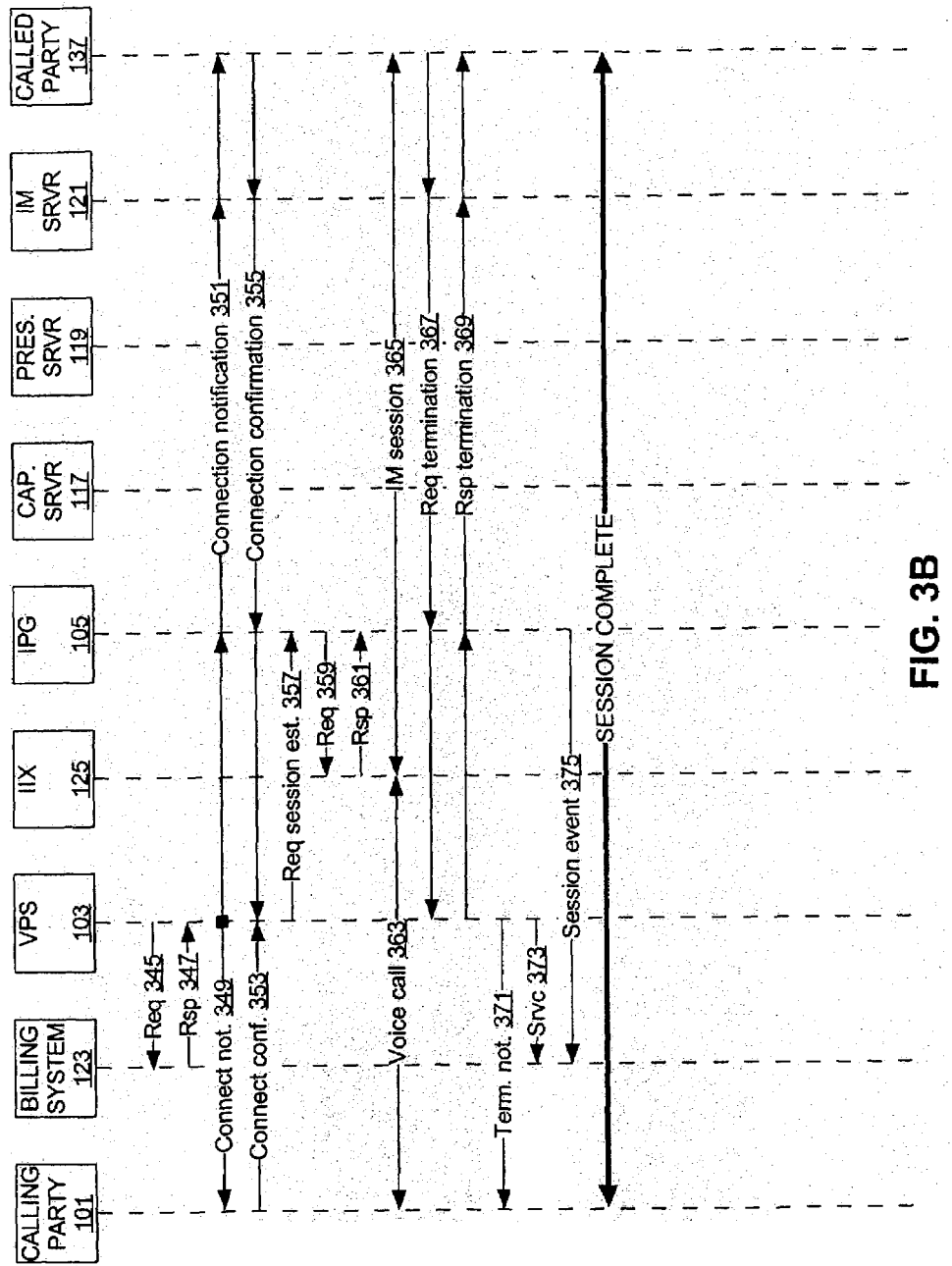

In FIGS. 3A and 3B, the caller is connected to the called party through IIX in much the same way as in FIGS. 2A and 2B, but it is the called party who disconnects the call.

Figure 4A:
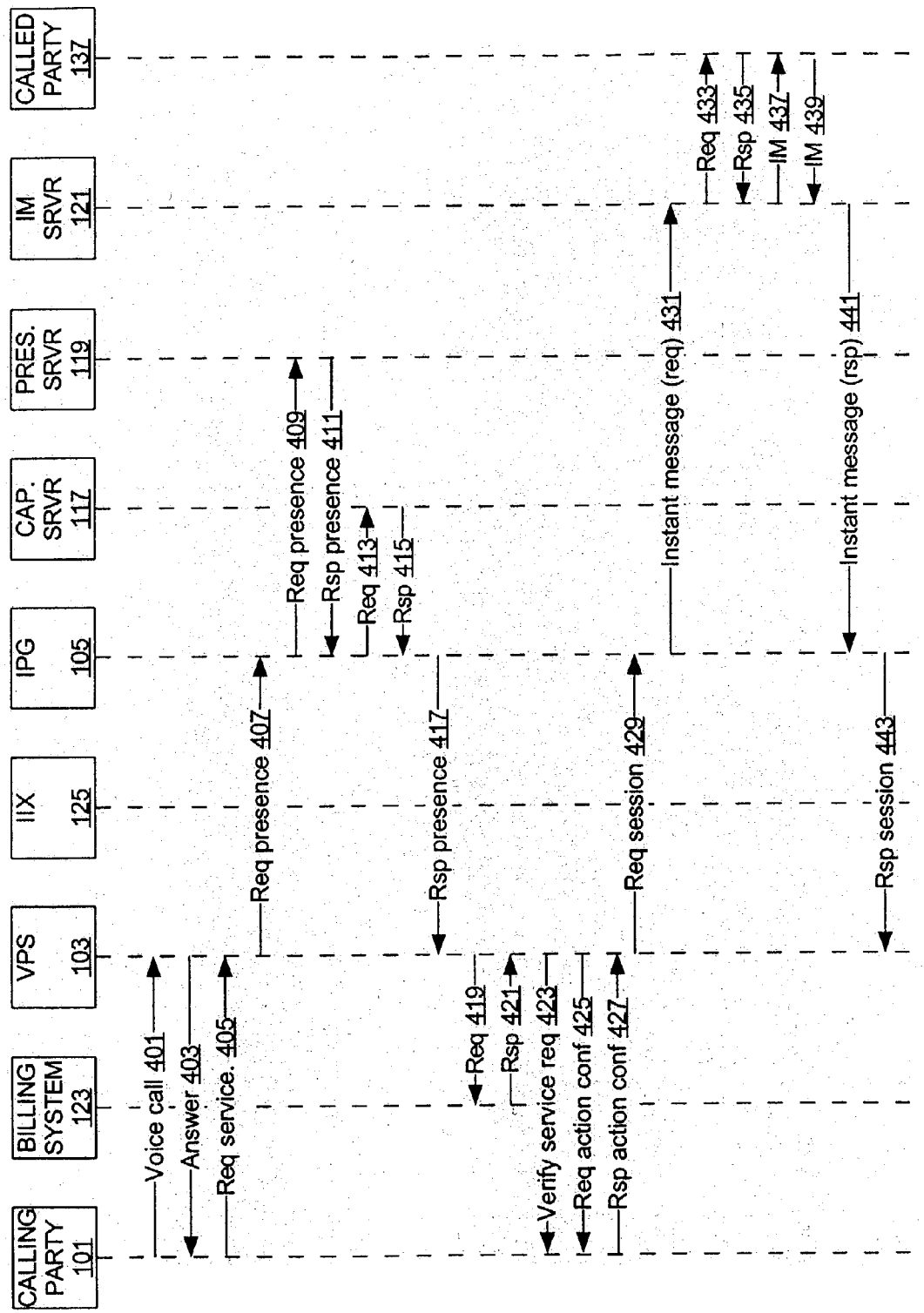
FIGS. 4A and 4B together depict a call-flow diagram of a presence-based call completion session with calling party re-origination in accordance with one embodiment of the present invention.
Figure 4B:
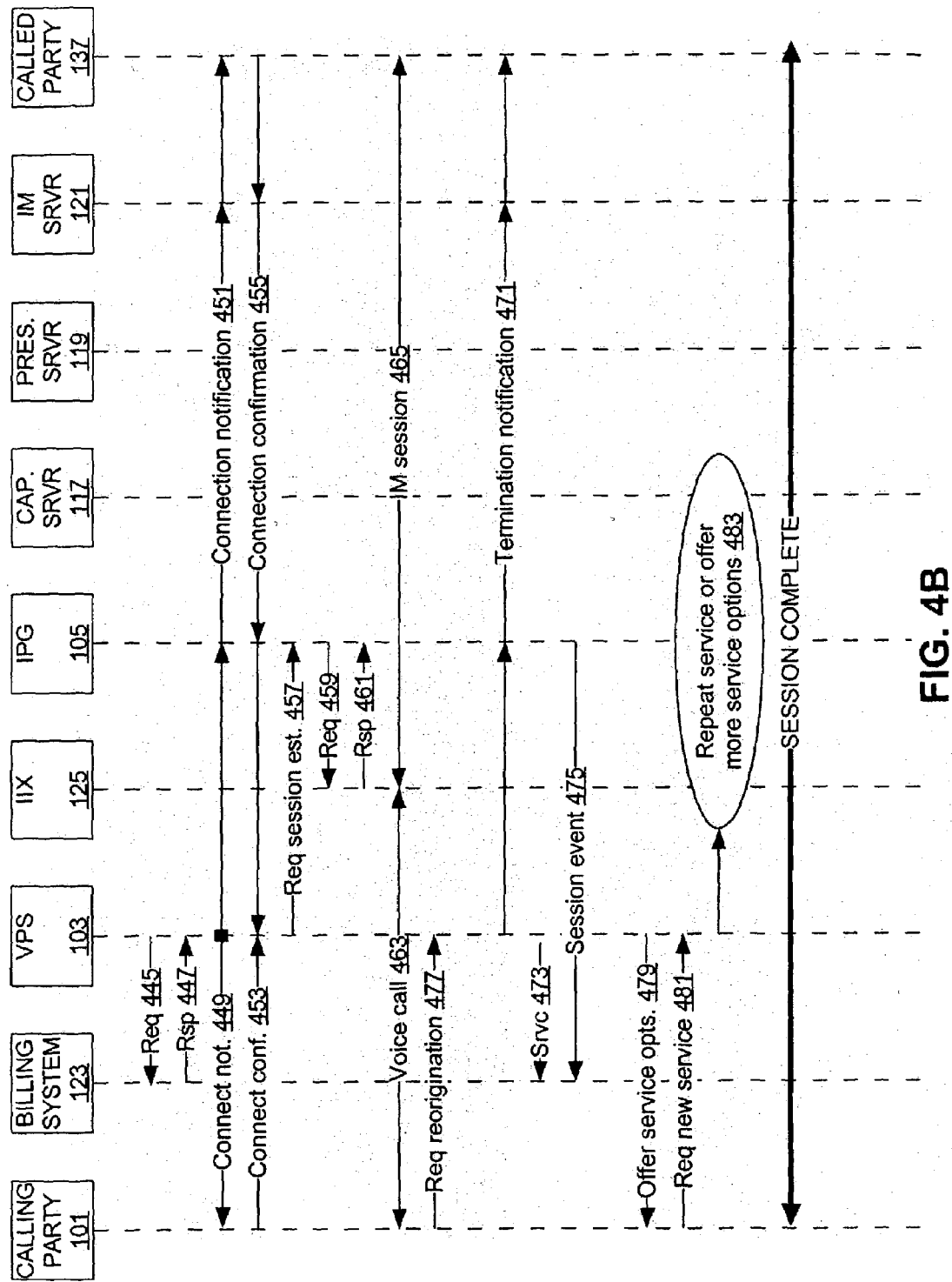

In FIGS. 4A and 4B, the caller disconnects the call with the called party but stays coupled to VPS 103 in order to "reoriginate" another call perhaps to a different called party.

Figure 5A:
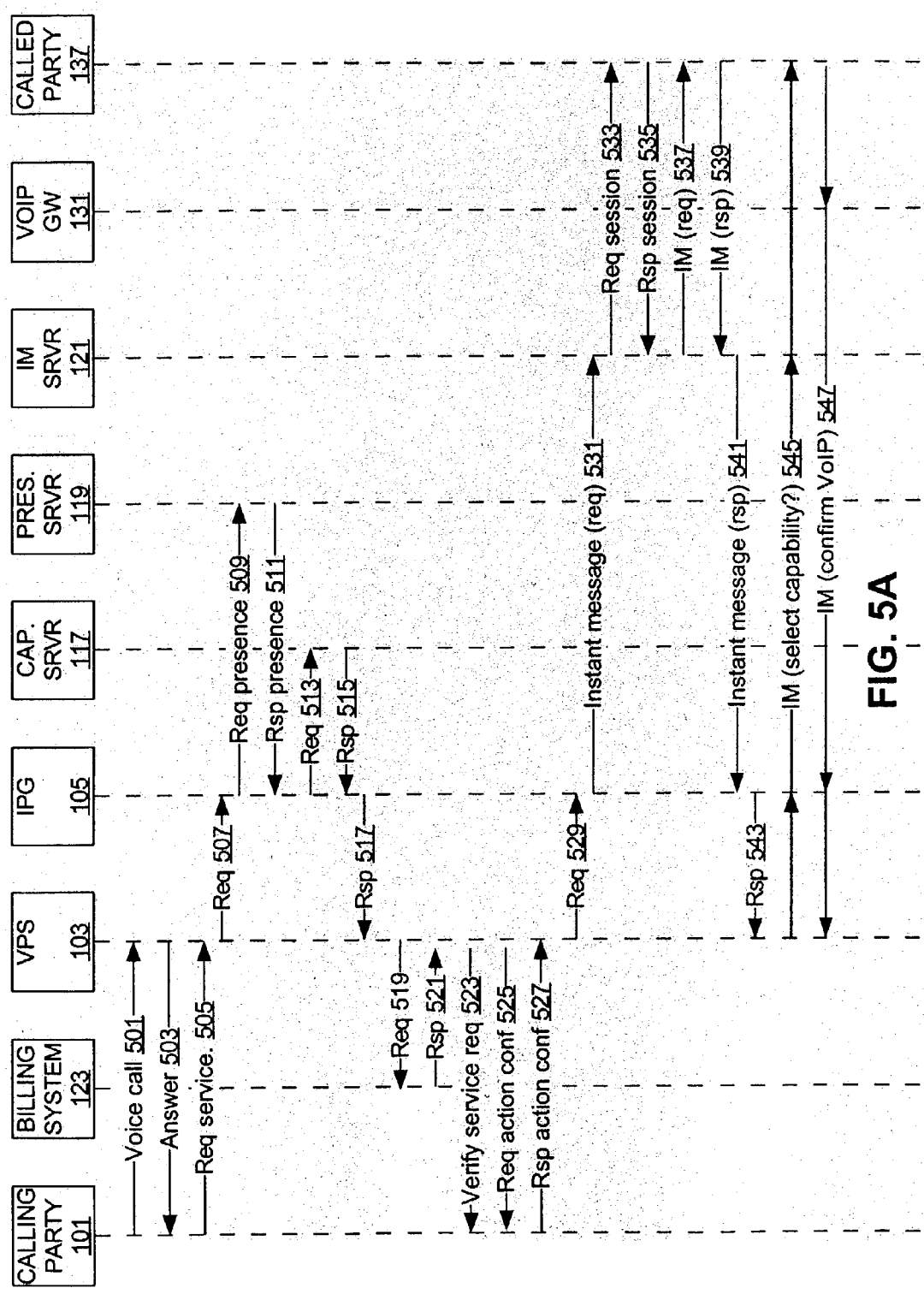
FIGS. 5A and 5B together depict a call-flow diagram of a presence-assisted, Voice-over-IP call completion session in accordance with one embodiment of the present invention.
Figure 5B:
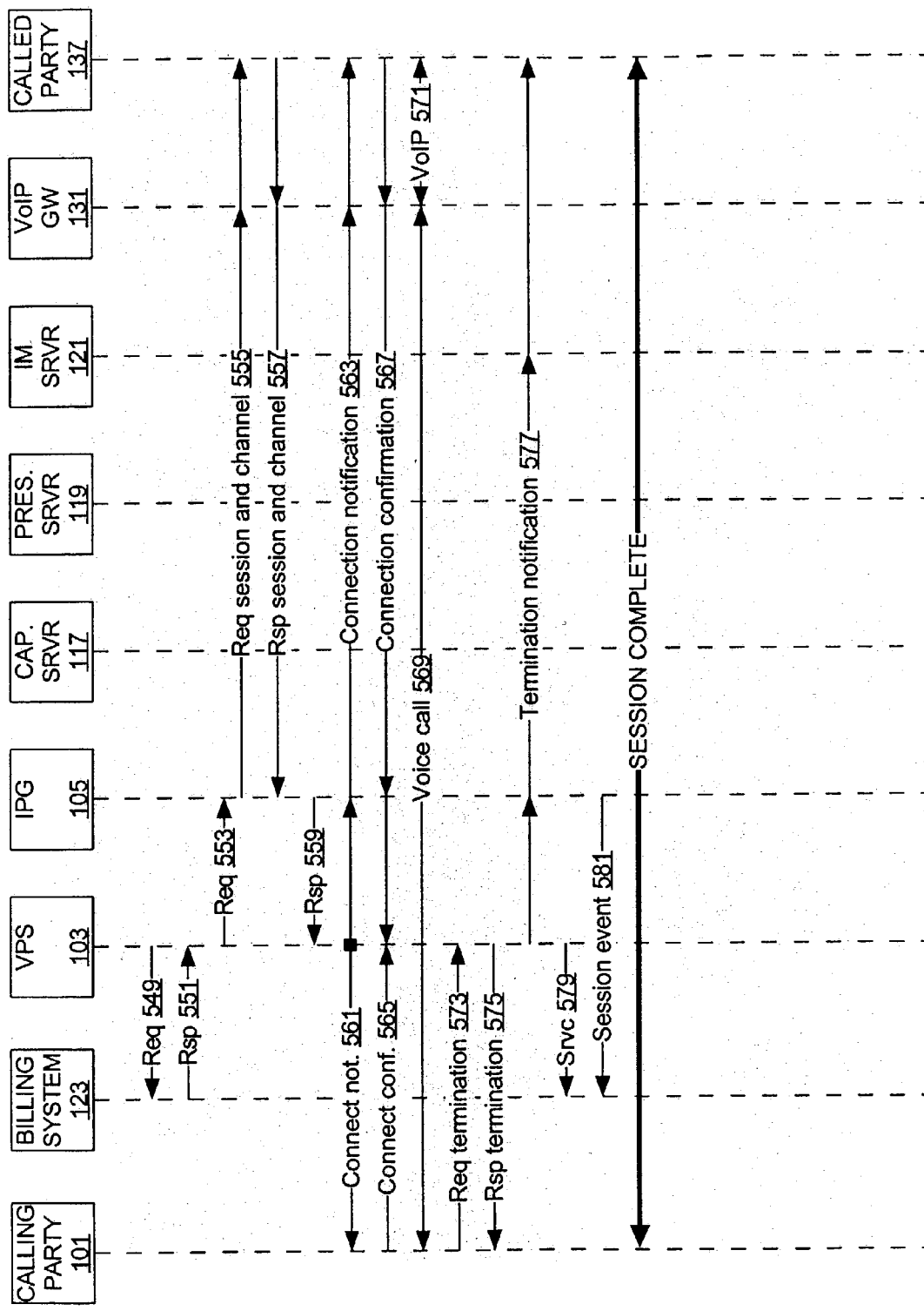

In FIGS. 5A and 5B, the called party elects to use a voice-over-packet capability of their instant communications client to engage in voice communications with the calling party.

These call flows depicting control information and the like being passed among the functional elements of FIG. 1 are merely examples and are not intended to represent all of the interactions contemplated among these elements.

Calling party 101 may have different call experiences depending on the how calling party reaches VPS 103, such as what telephone number is dialed by the calling party to reach VPS 103. Various call experiences are described in detail below in conjunction with FIGS. 7A through 9D. The main differences among the call experiences relate to how the calling party invokes call completion to an instant communications client and whether such completion is offered as a primary mode of completion or as a secondary mode of completion. A typical sequence of interactions among elements will now be described in conjunction with FIGS. 2A and 2B. This sequence of interactions may be representative of several possible services or usage scenarios and, with minor variations, may be applicable to all of the call experiences that will be further described later.

FIGS. 2A and 2B together constitute a call flow illustrating presence-based call completion wherein the call is eventually concluded by the calling party. Each arrow in the call flow of FIGS. 2A and 2B represents interaction of some nature between elements of FIG. 1. These actions are generally communications among elements which, depending on the circumstances, may include, for example, vocal communications, textual communications, call setup signaling, control signals and event notifications.

In FIG. 2A, calling party 101, via telephone 102, places a call to, or otherwise becomes connected with, VPS 103. For example, calling party 101 may dial a number corresponding to a collect call service implemented by VPS 103. Calling party 101 may access VPS 103 for the purpose of placing a collect call to called party 137.

The placing of the call to VPS 103 by calling party 101 is represented in FIG. 2A by action 201. Action 202 represents the answering of the call by VPS 103, or an operator 52 therein (see FIG. 1), and may comprise an audible greeting to the caller along with a prompt for the caller to provide input to specify the called party they want to contact.

In action 203, the caller provides input about the called party they are seeking. In scenarios other than a collect call, such as a prepaid calling card arrangement, action 203 may also entail the caller providing a calling card number and a PIN number or otherwise providing information as to how the call is to be billed.

Action 204 may serve to notify billing system 123 that VPS 103, or generally system 100, is being accessed to provide service. Billing system 123 may note this indication as part of its role in assessing charges for usage of the service. These charges may be billed to calling party 101, to called party 137 or to some other account.

In action 204, VPS 103 may communicate with billing system 123 to verify the billing information which may have been provided by the caller or obtained by other means such as a database look-up. The billing information may be associated with the called party, the calling party, a third party account or some other account. In the case of a collect call, the billing information of the called party will likely be checked. It is further possible that signaling information accompanying the inbound call or a line information database (LIDB) or profile information database may also be examined at this point to verify the called party's or calling party's ability to participate in collect calls or whatever type of call is being requested.

If billing system 123 performs an authorization role as just described, action 205 may represent the response from billing system 123 indicating to VPS 103 whether or not the call completion or other service requested by calling party 101 may be performed. Assuming this authorization is granted, action 206 is then performed by VPS 103 or an operator 52 therein.

Action 206 generally represents actions performed by the operator, which may vary depending on what type of call or service has been requested by calling party 101. In the present example of a collect call, VPS 103 (an operator 52) may initiate a telephone call to called party 137 in the traditional manner by announcing the call to the called party and asking if the called party will accept the charges for the call. In a particular instance, the called party 137 might not be reached by the operator or may decline the collect call. Action 207 represents the operator informing calling party 101 that the attempted collect call cannot be completed at the present time.

In accordance with exemplary embodiments of the present invention, the operator may at this point offer calling party 101 the option of attempting to engage in instant communications, such as textual chat, with the called party as an alternative to a telephone conversation. Other alternatives, such as voice mail, may be offered as well.

Action 208 represents the response of the calling party to the operator's offer to use instant communications. Assuming the calling party agrees to use instant communications, action 208 may be viewed as being essentially another request for service by calling party 101 to VPS 103.

To pursue the prospect of connecting calling party 101 with called party 137, VPS 103 solicits presence information from IPG 105 as represented by action 209. This request for presence information, as well as the eventual response shown as action 217, may take place, for example, through connection 10 shown in FIG. 1.

In accordance with one approach described earlier with respect to fetcher process 111, IPG 105 may request and obtain, in actions 211 and 212 respectively, presence status information for the called party from presence server 119. In the request to presence server 119, the called party may be specified by a chat screen name or other identifier by which the called party is known to presence server 119.

It should be noted that presence server 119 will usually have maintained a presence state for called party 137 before the time of presence request 211 and often even before the calling party's initial call (action 201) to VPS 103. Action 210 represents called party 137, or more particularly called party client 139, notifying presence server 119 of its availability state at some point prior to the requesting of presence information in action 211. This approach will often allow determining availability of called party 137 before contact is actually attempted with called party 137 or called party client 139.

As shown in actions 213 and 215, IPG 105 may also consult capabilities server 117 to obtain information, such as preferences or capabilities pertaining to called party 137 and/or calling party client 139. For example, capabilities server 17 may return information as to whether called party client 139 supports voice-enabled chat and whether called party 137 generally prefers to use textual or voice communications.

After obtaining presence information and other information, IPG 105 provides the information in a response to VPS 103 as represented by action 217. Actions 209 through 217 represent a novel coupling of an interactive voice processing system to a presence-determining function in accordance with preferred embodiments of the present invention.

At this point VPS 103 may optionally involve billing system 123 as shown in actions 219 and 221. For example, VPS 103 may determine, perhaps in response to information gleaned in actions 209-217, whether further service should be performed based on the called party's ability to pay or upon other determinations that may be made in conjunction with billing system 123.

In practice, many such factors may be considered in determining whether calling party 101 may ultimately establish communications with called party client 139. Making this determination may involve, for example, obtaining, from a presence server, presence state information pertaining to the second party, contacting the second party and obtaining an indication from the second party as to the acceptance of instant communications, determining whether the first party is eligible to establish instant communications with the second party, determining whether the second party is eligible to receive instant communications from the first party, and determining whether the first party desires to establish communications with the second party using instant communications. Depending on implementation, various ones of these factors may be applied by billing system 123 or by other elements in the course of service processing.

In action 223, VPS 103 may inform calling party 101 that called party 137 may be accessible via instant communications. In action 223, or separately in action 225, VPS 103 may request confirmation from calling party 101 that they indeed wish to proceed with instant communications with the called party. In action 225 VPS 103 may also solicit the preferences of calling party 101 in terms of whether to use textual chat or voice if supported by the called party client 139. As part of action 225, the operator may ask how the calling party 101 prefers to be identified to the called party 137. The response by calling party 101 to these prompts is shown by action 227.

Referring now to FIG. 2B, it may be seen that, having determined that the calling party desires chat and that the calling party appears to be capable of engaging in chat, VPS 103 proceeds to contact called party 137 and invite them to converse with calling party 101. VPS 103, via IPG 105 and IM server 121 as depicted by actions 229 and 231 and 233, initiates a dialog with called party 137, or particularly the called party client 139 being used by called party 137. In action 229, VPS 103 may include a message such as "Roger is calling from a phone and would like to chat with you. Can you chat now?"

Action 233 represents a session initation to establish instant messaging communications with called party 137 and action 235 represents the acceptance of the session. Action 237 is an instant message to received by the calling party containing the aforementioned "Can you chat now?" invitation.

Called party 137 provides a response to the invitation in action 239 which, through actions 241 and 243, reaches VPS 103. At this point, billing system 123 may optionally be informed of the acceptance of called party 137 as evidenced by action 245. For example, in some implementations, this event may be significant to billing system 123 as representing the commencement of billable usage by the parties.

As shown by action 247, billing system 123 may also be involved in authorizing further action to connect the parties. In some scenarios, part of action 245 may include the passing of information obtained from called party 137, such as billing account information or authorization codes, so that billing system 123 can take such information into account. In action 249, VPS 103 may inform calling party 101 by voice that they are about to engage in a telephony-to-instant-communications session with the called party. VPS 103 may also convey any instructions about how to participate in the session. Likewise, VPS 103 may also provide a connection notification, action 255, comprising a textual message telling called party 137 about the impending commencement of the session.

Optionally, actions 249 and 251 may give rise to corresponding confirmations 253 and 255. These optional confirmations may be desirable if, for example, charges for the session or other aspects of the connection must be approved by either or both of the parties. Billing related actions 245 and 247 shown earlier may optionally be performed after, and responsive to, these confirmations.

As shown by action 257, VPS 103 then requests IPG 105 to establish a session between the parties. This session, between calling party 101 using a telephony connection and called party 137 using an instant communications client, involves engaging intelligent information translator 125 to perform substantially real-time conversion among speech signals and textual information.

Accordingly, IPG 105 sends a media channel request, in action 259, to the intelligent information translator 125, which allocates the needed resources for a speech-to-text process 127 and a text-to-speech process 129. This may involve reserving ports, allocating memory, and initiating new processes. The result of this allocation is sent back to the intelligent presence gateway 105 as a media channel response shown as action 261. This response may include identifiers, port numbers or other information involved in coordinating communications establishment through IIX 125.

Upon successful allocation of a media channel, the intelligent information translator 125 connects the calling party 101 to the media channel, enabling voice channel connectivity as represented by action 263. On the called party end, the intelligent information translator 125 establishes a chat or other instant communications session with the called party 137 via the sender and receiver processes 127, 129 and the instant messaging server 121, and binds the instant message session to the media channel. This instant communications connection, represented by action 265, may be achieved by having IIX 125 take up the same IM session established with the called party 137 in action 231. In this manner, called party 137 experiences continuity of the one session rather than having to separately establish a session for conversing with the calling party 101. At this point, calling party 101 and called party 137 are in communication with one another.

As the conversation proceeds, speech recognition algorithms are applied by the speech-to-text process 127 to convert utterances in the speech of the calling party 101 into a textual or character-based representation that is transmitted to the called party 137 via the sender process 113 and the instant messaging server 121. Conversely, text messages comprising words, abbreviations, and so-called "emoticons" received from the called party 137 via the instant messaging server 121 and the receiver process 115 are converted into a speech representation of the words by the text-to-speech process 129. The resulting speech signals may be transmitted to the calling party 101 via the voice-over-IP gateway 131 or through connection 44, VPS 103, bridging switch 54 or other means. Speech-to-text process 127 may employ any of the well known speech recognition technologies available from companies such as Nuance, SpeechWorks, IBM, or Dragon Systems, for example. Text-to-speech process 129 may use DECtalk™ speech synthesis technology developed by Digital Equipment Corporation, for example. This translation may also be performed manually by a human operator listening to the utterances via a headset and typing in the text in one direction, and reading the text on a screen and providing a spoken representation in the other direction.

Communications among the parties proceeds in this manner through IIX 125 until the parties are finished communicating or until a balance of a billable account is exhausted. For example, at some point during the call, the calling party 101 may wish to terminate the call. This may occur by hanging up of the telephone used by the calling party 101. This action results in a termination request, action 267, being sent from the calling party 101 to VPS 103. In practice, this termination request may be conveyed as telephony signaling, for example. In some implementations, VPS 103 may confirm the termination by sending a termination response, action 269, to the calling party 101.

VPS 103 sends termination notification, action 271, to the called party 137 via the intelligent presence gateway 105 and the instant messaging server 121. As represented by action 273, VPS 103 may transmit a service event to billing system 123 as the session is ended. Intelligent presence gateway 105 may also provide a session event, action 275, to the billing system 123. Actions 273 and/or 275 may be performed so that usage activity may accurately reported upon and charges can be accurately calculated.

As with all of the calls flows in FIGS. 2A-5B, the sequence of events depicted in FIGS. 2A and 2B are intended to be merely illustrative and should not be construed to be the only manner in which the present invention may be embodied. Many of the actions shown may be augmented by other actions, omitted, or performed in a different sequence or among different elements than as shown. For example, VPS 103 could participate in engaging IIX 125 directly rather than having IPG 105 do so. Furthermore, according to an alternative approach, aspects of call termination and billing notifications may be performed by IIX 125, especially considering that IIX 125 is actively engaged in the session until it is concluded.

Termination of communications may also occur other than as shown in FIGS. 2A-2B. For example, the called party 137 may signal termination by ending the instant messaging session or providing some other indication as may be appropriate in a particular implementation. This scenario is shown in FIGS. 3A and 3B. In FIGS. 3A and 3B, the steps starting from the initial voice call 301 in FIG. 3A through the establishment of the voice call 363 and instant message 365 occur as substantially described with respect to steps 201 through 265 hereinabove in FIGS. 2A and 2B, with some details omitted for simplicity. However, in this called party termination scenario, the called party 137 sends a termination request, action 367, triggered by the ending of the session, to IIX 125 or, depending on implementation, to the voice processing system 103 via the instant messaging server 121 and the intelligent presence gateway 105. The voice processing system 103 (or IIX 125) confirms the termination by sending a termination response, action 369, to the called party 137 via the intelligent presence gateway 105 and the instant messaging server 121, and by sending a termination notification 371 to the calling party 101. As before, the voice processing system 103 transmits a service event 373 to the billing system 123, and the intelligent presence gateway 105 transmits session event 375 to the billing system 123.

FIGS. 4A and 4B illustrate a call re-origination scenario, in which the calling party 101 indicates a desire to make another call without hanging up or reentering the billing information, for example by pressing the pound key (#) on a telephone keypad for two (2) seconds. In this scenario, the steps starting from the initial voice call 401 in FIG. 4A to the establishment of communications among the parties represented by actions 463 and 465 are substantially as described with respect to steps 201-275 presented above in FIGS. 2A and 2B. However, during the 'call', the calling party 101 makes the re-origination request 477 which is detected by VPS 103, perhaps via bridging switch 54. In response, the connection to called party 137 is terminated as shown by action 471, which is optional and may include, for example, a textual notification of the termination for the benefit of called party 137. Actions 473 and 475 inform billing system 123 of the conclusion of the session. Then the operator at VPS 103 offers new service options as shown by action 479. The calling party 101 submits a new service option request 481, which is handled by VPS 103 by taking appropriate steps 483. If the calling party 101 wishes another instant message based communication, then the steps described herein above may be repeated. The interaction just described for VPS 103 may involve or be performed entirely by IIX 125 as well.

In another embodiment of the present invention, instant communications is used initially to contact the called party 137 for obtaining billing and capabilities information, but the call is actually then terminated in a voice-over-IP session at the option of the called party 137.

FIGS. 5A and 5B illustrate the operation of this embodiment, in which steps 501-543 (transmission of the session response 543 from the intelligent presence gateway 105 to the voice processing system 103) proceed as substantially described with respect to corresponding steps 201-243. However, operator 52 at voice processing system 103 may detect that the called party client 139 is capable of voice-over-IP based on the information in the capability information response 515. An alternative to the process of obtaining information from capabilities server 117 may be to query the called party client 139 directly using, for example, SIP mechanisms for exploring client capabilities. In response the operator may send an instant message 545 to the called party 137 via the intelligent presence gateway 105 and the instant messaging server 121. Instant message 545 may ask the called party to select which capability, voice or text, the called party prefers to use. In reply, the called party 137 returns an instant message 547 that confirms that the voice-over-IP capability of the called party client 139 is to be used. This can happen at any time during the communication session.

After interaction with the billing system 123 using billing request 549 and billing response 551, the operator at VPS 103 sends the intelligent presence gateway 105 a session establishment request 553. In response, the intelligent presence gateway 105 sends a session and channel request 555 to the voice-over-IP gateway 131, which establishes a voice-over-IP session with the called party client 139. A session and channel response 557 is then sent from the called party client 139 to the intelligent presence gateway 105. The intelligent presence gateway 105 then sends a session establishment response 559 to VPS 103.

To complete the establishment of the call, VPS 103 provides a connection notification 561 to the calling party 101, and a connection notification 563 to the called party 137 via the voice-over-IP gateway 131. In return, the calling party 101 provides a connection confirmation 565 to VPS 103 and the called party 137 provides a connection confirmation 567 to VPS 103 via the voice-over-IP gateway 131. At this point, the voice-over-IP gateway 131 interfaces a voice call leg 569 with the calling party 101 and a voice-over-IP call leg 571 with the called party client 139. These requests, responses, notifications, and confirmations may be carried out using computer generated messages or using human-intelligible voice prompts and Dual Tone Multi-Frequency (DTMF or "touch tone") or spoken responses.

Upon conclusion of the call, the call between the calling party 101 and the called party 137 is torn down in steps 573-581 substantially as described herein above with respect to steps 267-275 in FIG. 2B.

In the preceding description of FIGS. 2A-5B, billing system 123 was shown to participate in collecting information indicative of usage activity in the communications system and in authorizing activity based on whether such activity could be paid for in some manner. It should be noted that various elements in FIG. 1 may report a variety of indications to billing system 123 indicating usage of the system which may be billable. The billing system may note these occurrences and determine charges associated with the usage. Furthermore, as depicted in FIG. 2A-2B and others, billing system 123 may also participate in authorization or metering of activity in the system based upon whether a valid account exists to which charges may be applied.

Some types of activity or events in the system relate to invocation of certain actions or features for which charges may be applicable. For example, a calling party (or some other entity to be billed) might be charged for each time they contact the system, each time they use the system to verify presence status for a called party or for each attempt to establish instant communications with a called party. A calling party might also incur fees for having the system map a first identifier, such as a telephone number, to a second identifier, such as an instant messaging screen name.

A calling party might be charged differently for invocation of textual messaging versus voice communications. A calling party might be charged a fee each time a translator is engaged to enable telephony-to-instant-communications call completion. A calling party may even be charged for requesting information about the balance on an account.

Other types of activity in the system may relate to quantifying usage of system resources. For example, charges may be applied based upon a time duration of a communications session, a volume of data or traffic handled by the system, or a quantity of translation performed.

A third possibility for billable activity in the system relates to options and features and subscribed services. Options or features may relate to class of service provided by the system or to customizability. In particular, parties using the system might pay extra to control the translator function in ways such as selecting languages to be used during translation, providing support for 'emoticons' or selecting voice characteristics to properly represent the gender or other characteristics of the party who is using textual messaging, or establishing of common phrases, utterances, or signals including, for example, one or more DTMF signals to signify meaning and therefore enhance communications. Another option that might be billable is automatic notification of balance or charges as a party uses the system. In this third category, it is likely that the billing system mostly serves to authorize activity based upon options selected by the user and/or the status of an account that is to pay for the options.

Referring now to FIGS. 7A through 9D, three processes are shown depicting three different call experiences that might be provided to a calling party by the system of FIG. 1.

It should be noted at the outset that processes 700, 800 and 900 are merely illustrative and not intended to limit the ways in which the present invention may be realized. Many adaptations and variations are possible. For example, throughout processes 700, 800 and 900, the involvement of billing determinations may occur at any juncture in the service processing subject to how one desires to have the system operate. In actual practice, the offering of alternative modes of communication, the soliciting of information from a party and the retrieval of information from databases and such may differ in details and in sequence from what is shown in these examples without affecting the spirit and scope of the present invention.

Furthermore, at points where these processes may involve determining, for example, preferences of the communicating parties or billing information, such information may be obtained from a database, such as capabilities server 117, so that user profile information replaces or augments user input. In other words, it is possible for configurable profile information associated with a party to be maintained in a database or the like and to be applied to automating some aspects of how system 100 provides service to calling party 101 and called party 137. For example, called party 137 may desire to have all inbound calls diverted to called party client 139 during certain times of day. This preference information may reside in capabilities server 117 or elsewhere and may be automatically retrieved and applied in, for example, steps 710 and 714 described below. Called party 137 may have billing information or preferences similarly maintained in a database accessible to system 100 so that any steps requiring billing input are automatically carried out without requiring input from the called party.

In general, the manner and sequence in which the activities of processes 700, 800 and 900 may be controlled by profile information associated with parties using system 100. Service processing may also be affected by coupling to other systems or elements that maintain and use service-affecting profile information. For example, SIP server 135 may maintain profile information relating to called party 137 or called party client 139. Intelligent presence gateway 105 may coordinate with SIP server 135 so that features such as "Find me—Follow me" implemented in a SIP-controlled environment may be carried out in coordination with other aspects of system 100.

In accordance with a first call experience, a calling party reaches the voice processing system 103 by telephone with the original intent of reaching a called party by telephone connection. For example, the calling party may dial "1-800-COLLECT" as they would normally do to use VPS 103 to place a collect call to the called party. The system proceeds to process the collect call as usual. If the call cannot be completed in this manner, then, in accordance with the present teachings, the system investigates the possibility of connecting the calling party to the called party via instant communications. This scenario is described below in conjunction with FIGS. 7A-7D.

In accordance with a second call experience, the calling party reaches the voice processing system by calling a specific telephone, such as "1-800-GET-CHAT", for the express purpose of initiating instant communications with the called party. This scenario is described below in conjunction with FIGS. 8A-8D.

In accordance with a third call experience, the calling party directly calls the called party by telephone in the usual manner. When it is detected that the called party telephone is busy or ringing without being answered, the calling party is connected to the voice processing system so that the caller may be offered alternative ways of reaching the called party.

In FIGS. 7A through 7D, a process 700 is depicted whereby an enhanced services system may offer a caller an option of communicating to an instant communications client of a called party in accordance with an exemplary embodiment of the present invention. Process 700 particularly illustrates a variety of alternatives and conditional steps in accordance with an exemplary embodiment of the present invention.

Figure 7A:
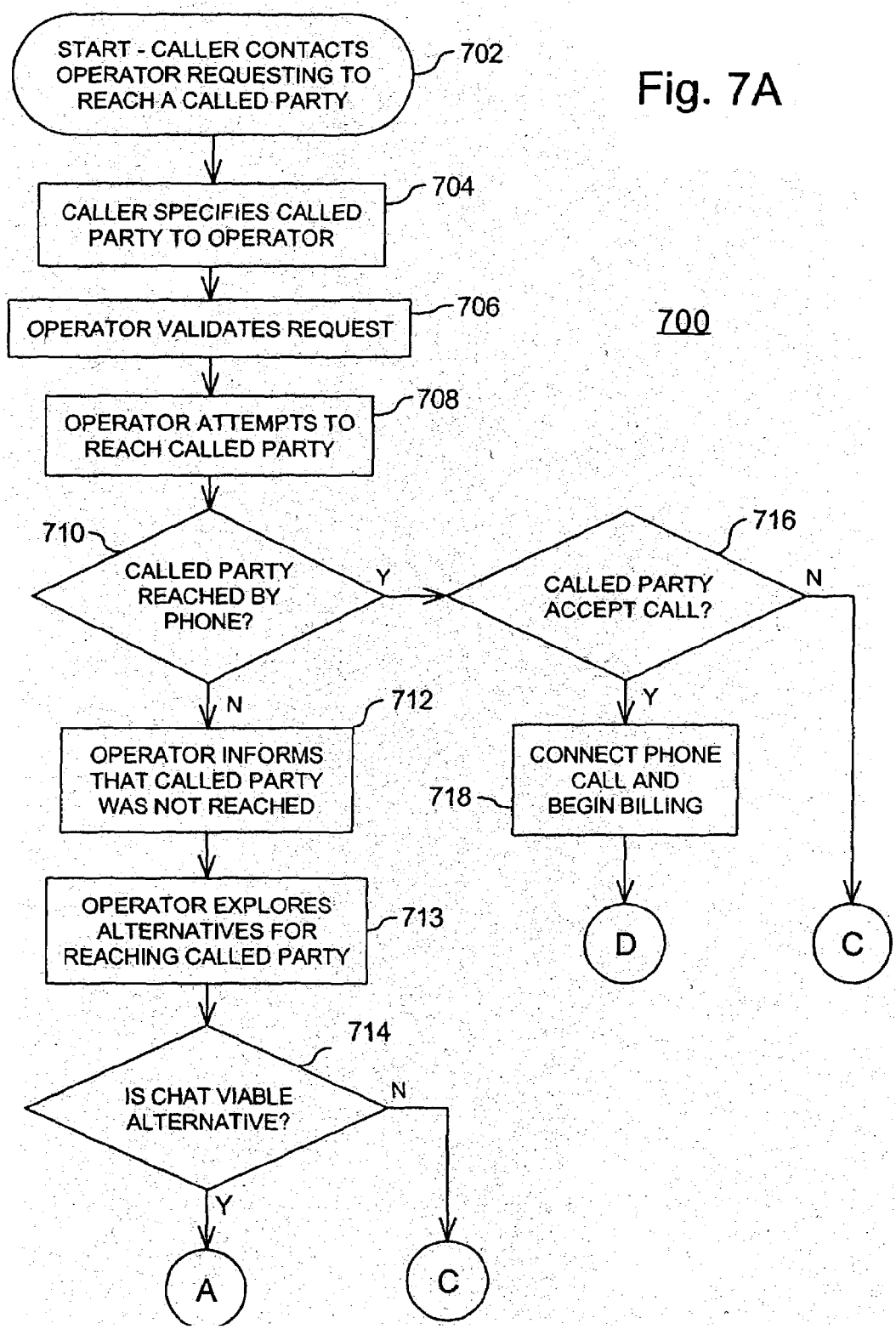
FIGS. 7A-7D depict a process by which an enhanced services system may offer a caller an option of communicating to a messaging client of a called party in accordance with an exemplary embodiment of the present invention.

Referring to FIG. 7A, process 700 commences at step 702 upon a caller calling a voice processing system, such as by calling party 101 contacting an operator 52 or other interactive respondent within voice processing system 103. Next, in step 704, the caller specifies to the operator a particular called party that the caller desires to contact. For example, the called party may be specified by name or by phone number, if known. In the case of an automated or semi-automated response system, the caller may provide the called party information via DTMF tones or by other transmission of signals, perhaps even by speaking into a speech recognizing system that can determine the name or number data being conveyed by the caller.

Proceeding to step 706, the operator validates the caller's request by, for example, ensuring the caller has expressed a valid telephone number according to the North American Numbering Plan. Of course, the validation may be performed automatically especially if, for example, the telephone number of the called party is input as DTMF tones or other signals from the caller in step 704. The validating step 706 may comprise validating the authority of the caller to access specific types of services offered via voice processing system 103. Validation step 706 may also comprise ensuring that the operator clearly understands what is intended by the caller. Ways of handling inbound calls that fail to be validated are well known or easily foreseen by those of ordinary skill in the relevant art and so are not elaborated upon here.

Assuming that, in step 706, the caller's request is valid, then process 700 continues at step 708 wherein the operator attempts to reach the called party by telephone, as represented called party phone 138 in FIG. 1. Thus far, process 700 is similar to the placement of a collect call. In step 710, it is determined whether the operator has been successful in establishing contact with the called party or at least with someone who has answered the telephone. If successful contact has been made, then execution proceeds to step 716 to determine if the answering party will accept the call. Typically, in the case of a collect call, the identity of the caller will be announced to the called party and the operator or voice processing system will ask the called party if they will accept the call (along with the charges for the call, if applicable).

If the caller accepts the call in step 716, then, in step 718, the caller is connected to the called party and usage-based billing may commence. Once the call is established, the operator is no longer needed on the line and, in practice, the connections, operator(s) and other resources employed within the services platform to initiate the call are released. In FIG. 1, for example, bridging switch 54 may typically be used to keep phones 102 and 138 connected, while allowing VPS 103 to disengage via a well-known release link trunk 55 coupling telephone circuits between bridging switch 54 and VPS 103. (For reference, one may consult U.S. Pat. No. 5,787,150 which shows a bridging switch and describes typical operation of a release link trunk.) Accordingly, then, after establishing the connection among parties in step 718, process 700 (following label 'D') proceeds to step 770 (FIG. 7D) causing the operator to be disengaged from the bridging switch. Process 700 then terminates, having successfully connected the parties and effectively handling the caller's request to contact the called party.

Returning to step 710, if the operator could not reach the called party by phone, then execution proceeds to step 712 wherein the operator informs the caller that the called party could not be reached by phone. Next, in step 713, the operator explores whether there are any other ways that the caller might communicate with the called party, such as by instant messaging or by depositing a voice mail message. The operator's exploration of other possibilities allows the operator to present appropriate options to the caller and may entail checking databases to see if, for example, the caller or called party are subscribed to various service options, such as voicemail, chat call completion, paging, etc., accessible to the operator.

In step 714, then, based on the operator's findings, a determination is made as to whether a chat session of some sort is a viable alternative by which the caller might communicate with the called party. If instant communications, such as textual chat, is a viable alternative, then process 700 continues to step 720 (FIG. 7B) and other steps to attempt to establish communications between the parties through an instant communications mechanism.

Specifically, in step 720, it is determined whether the operator already has access to information by which to contact the party through instant communications, such as by a chat interface. For example, it is conceivable that the operator may have access to a database mapping telephone numbers or personal names to "screen names" used to identify parties in an instant messaging system. On the other hand, the operator may not have such information and may have to solicit input from the caller. Thus, in step 720, if the operator does not have access to sufficient information to reach the called party by instant messaging, then step 722 is performed wherein the operator makes known to the caller that alternatives, such as chat, may be available and the operator asks the caller for contact information, if known. In step 724, if the caller wants to attempt a chat session as an alternative then execution proceeds to step 726, wherein the caller provides contact information by which the operator may attempt to reach the called party by chat or instant messaging. In step 728, the operator uses the contact information obtained in step 726 to then determine if the called party is presently available through a chat system. Referring to FIG. 1, this action might be represented by VPS 103 requesting presence information from watcher process 109 or fetcher process 111 over connection 10. As a called party logs onto client 137, client 137 may register its presence with presence server 119, making the communications status of client 137 available to watcher process 109 or fetcher process 111.

If, in step 728, it is determined that the called party is not present or unavailable through a chat session, then, in step 730, the operator informs the caller that the called party is not accessible by chat and execution proceeds, via the connector labeled 'C', to step 760 to possibly provide other alternatives as will be described in greater detail below.

Likewise, if, in step 724, it is determined that the caller does not want to try a chat session, then execution also proceeds to step 760 as described below.

Otherwise, if in step 728, it is determined that the called party is present and available via chat, then execution proceeds, following the connector labeled 'B', to step 740 of FIG. 7C to attempt a chat session with the called party as will be described shortly.

Returning to step 720, if the operator does have chat information for the called party without need of receiving same from the caller, then execution moves to step 732 to determine if the called party is present, using a similar manner to that described in step 728. If the called party is not present, then optionally, in step 733, the operator informs the caller that the party is inaccessible by chat. Thereafter, execution proceeds, following the connector labeled 'C' to step 760 to possibly provide other alternatives as will be described in greater detail below.

Otherwise, in step 732, if the party is available, then in step 734, the operator offers the caller the option of engaging in chat communications with the called party. In step 736, if the caller declines to use the chat alternative, then execution proceeds, following the connector labeled 'C', to step 760 to possibly provide other alternatives as will be described in greater detail below.

Figure 7B:
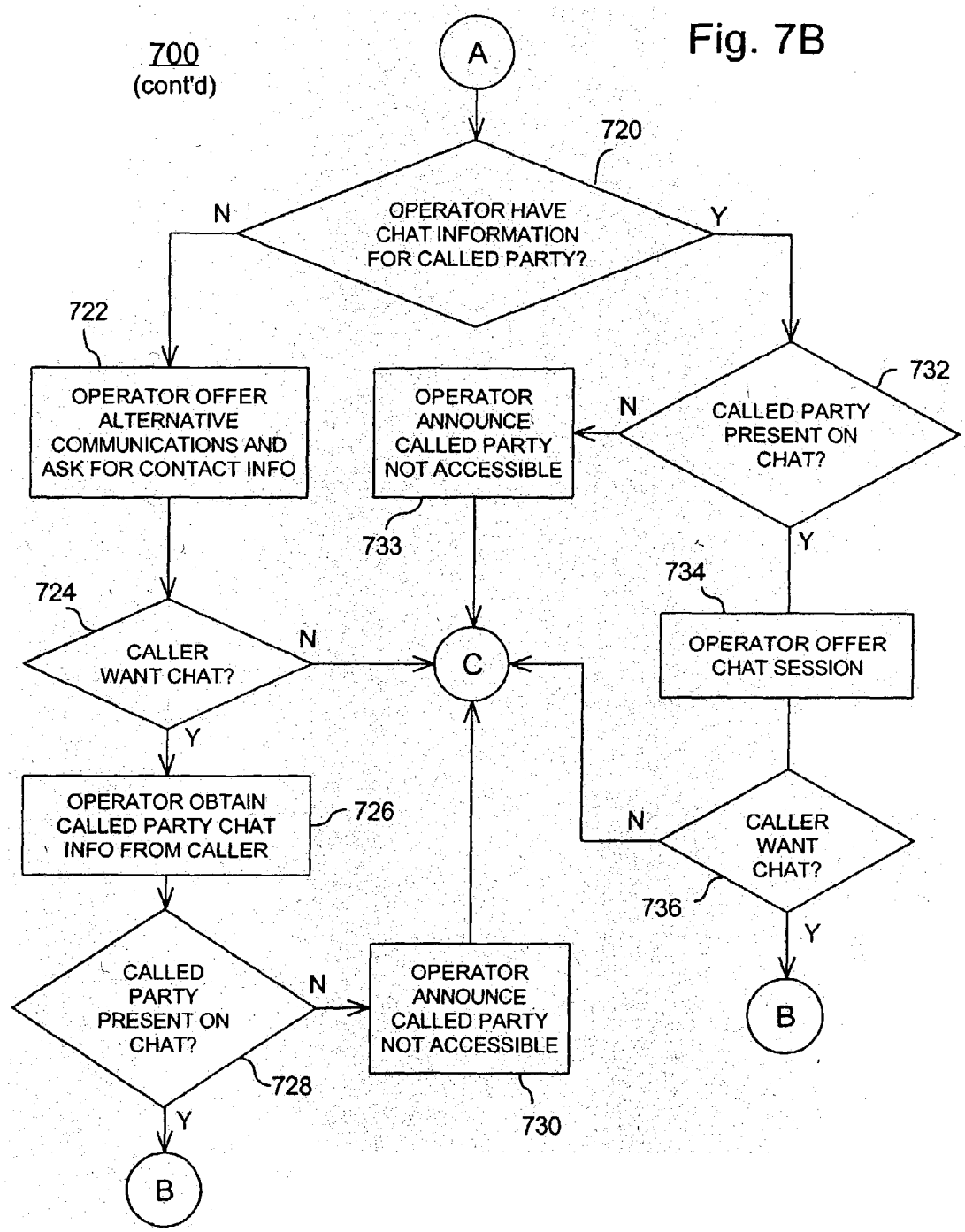
Figure 7C:
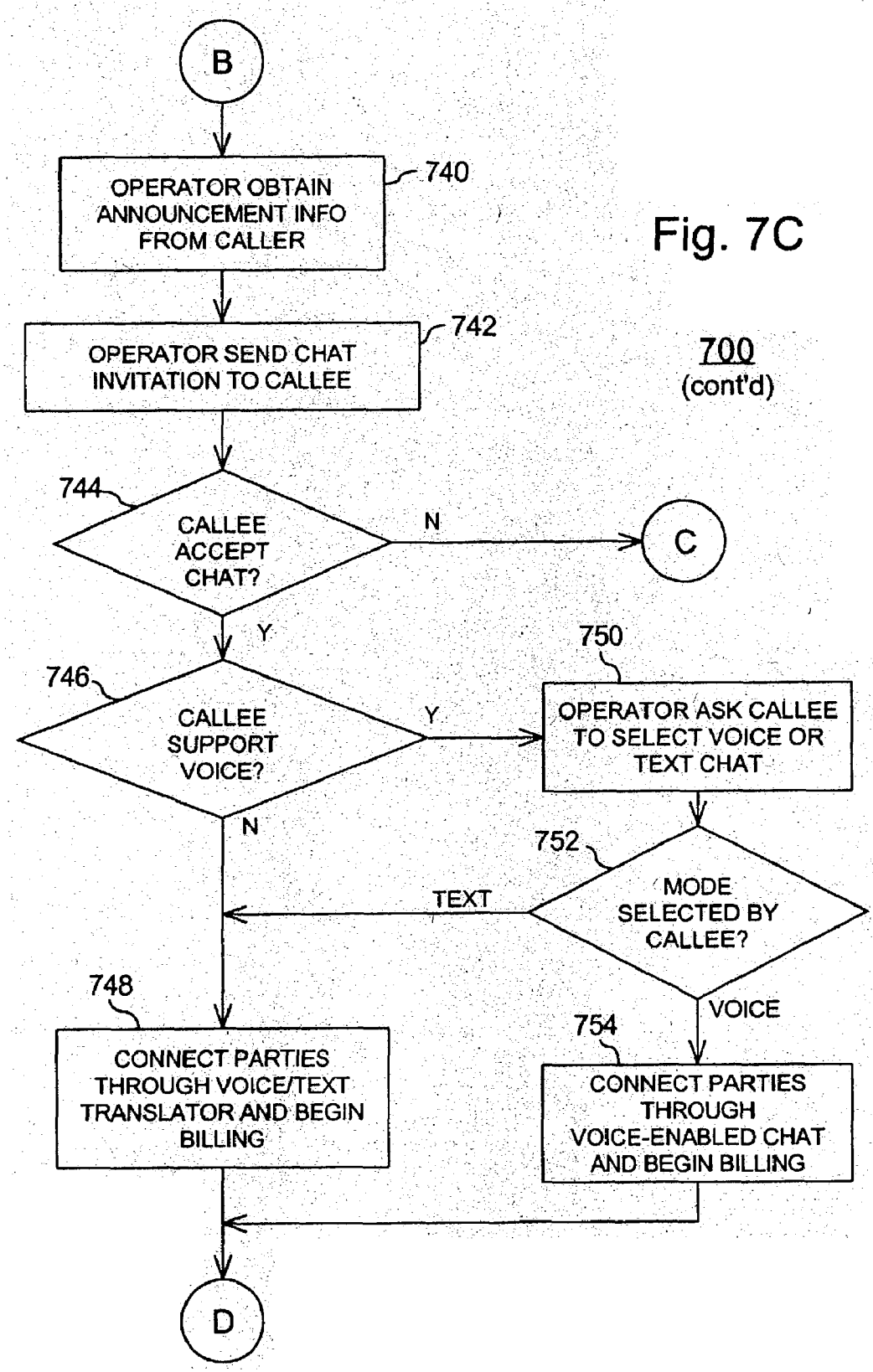

If, on the other hand, the caller does elect to try a chat session in step 736, then process 700 continues, following along the connector labeled 'B', to step 740 of FIG. 7C to attempt a chat session with the called party.

In FIG. 7C, process 700 continues with attempting to establish a chat session between the caller and the called party. At step 740, coming from either steps 728 or 736, the operator performs a preparatory step in obtaining information from the caller as to how they wish to be announced to the called party. In step 742, the operator contacts the called party (or "callee") and invites the callee to participate in a chat session with the caller. In this invitation, the operator introduces the caller using the announcement information obtained in step 740.

In step 744, the called party's response to the invitation is determined and if the invitation is declined, then execution proceeds, following the connector labeled 'C', to step 760 to possibly provide other alternatives as will be described in greater detail below.

Otherwise, if the called party accepts the chat invitation in step 744, then step 746 is executed to determine if the called party client supports voice communications (voice-enabled chat). This may be determined by retrieving profile information from, for example, the capabilities server 117 or by directly querying the called party 137 or called party client 139. If so, then execution proceeds to step 750 wherein the operator asks the called party if they would prefer to engage in voice chat or use text-based chat. In step 752, the called party responds by electing either text or voice. If the callee selects a textual session, then execution proceeds with step 748 wherein a text chat session is established between the parties through a voice/text translator (see translator 125) and billing for the session, if applicable, is initiated. Step 748 is also undertaken if the called party client is found to not support voice sessions in step 746.

Returning to step 752, if the callee elects to engage in voice communications through a voice-enabled chat session, then, in step 754, the parties are connected to carry on voice communications. Referring to FIG. 1, this may be represented by connecting the calling party phone 101 through voice processing system 103 or bridging switch 54 to VoIP gateway 131. This connection is completed by an RTP data connection through IP network 133 to called party client 139. This connection may be established by SIP signaling among SIP user agent 56, VoIP gateway 131 and SIP server 135, or by using H.323-type protocols or other suitable mechanisms.

Whether a voice connection as in step 754 or a textual chat session as in step 748 ensues, execution then proceeds, along the connector labeled 'D', to step 770 wherein the operator is disengaged from the "call" and then the handling of the caller's original request is concluded in step 772.

Figure 7D:
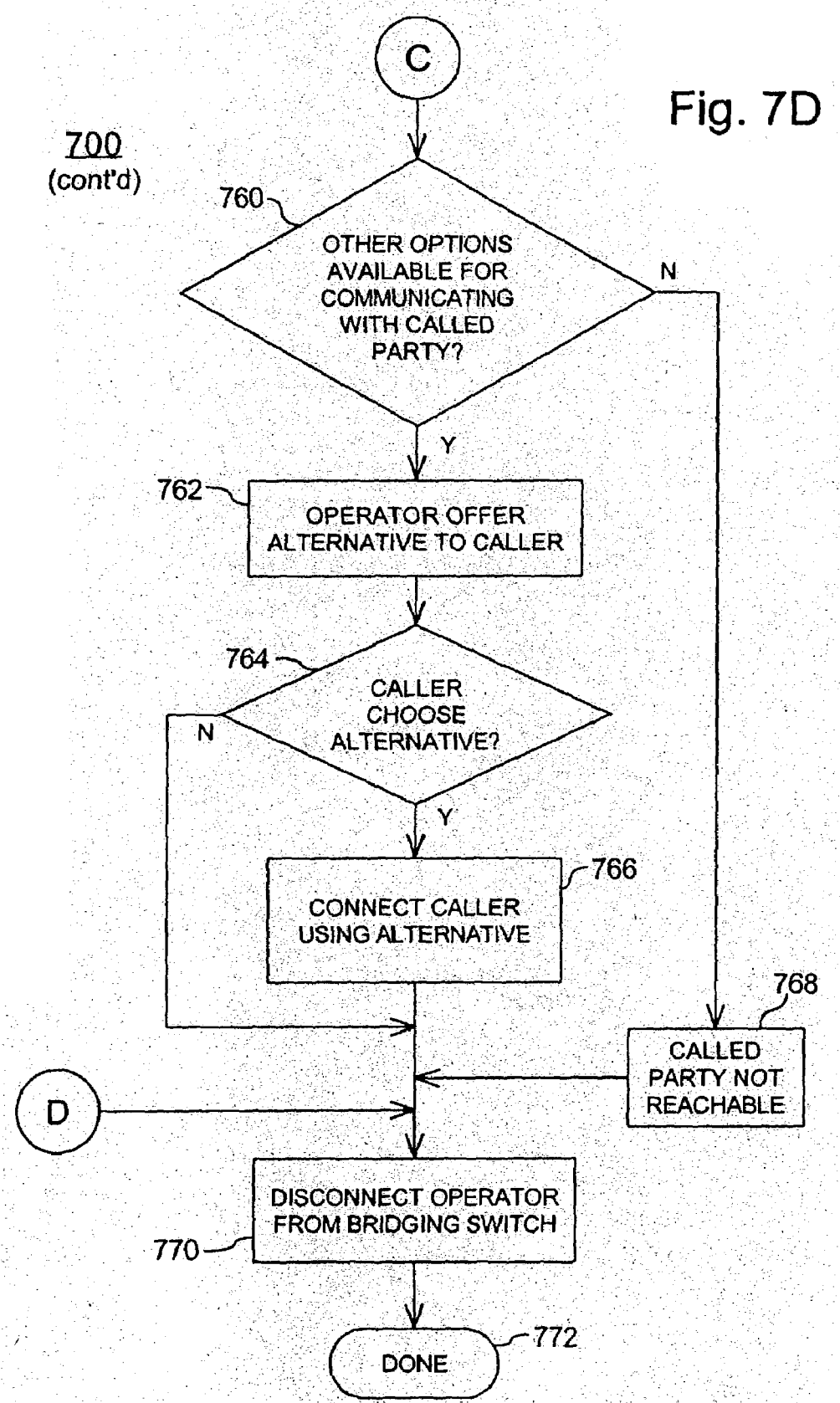

Referring to FIG. 7D, many determinations in process 700 may result in execution of step 760, generally when attempts to establish telephone or chat messaging to a party have been unsuccessful. In step 760, it is determined if there are yet other alternatives for communicating to the called party, such as paging or voice mail. If not, then in step 768, the caller is informed that the called party is not reachable by any further means beyond what may have already been offered to the caller. Processing then proceeds to step 770 to decouple the caller from the operator which, in this instance, essentially disconnects the caller.

If the condition tested in step 760 is found to be true, then, in step 762, such alternatives indicated as available in step 760 are offered to the caller by the operator. In step 764, it is determined whether the caller elects to use an alternative so offered. If so, then step 766 is performed wherein the caller is 'connected' in a sense to the alternative, meaning that the caller may be forwarded to a voice mail system or become coupled to a paging application, to name a few examples. Returning to step 764, if the caller elects not to use offered alternatives, then processing continues at step 770 to essentially disconnect the operator from the caller.

FIGS. 8A-8D depict a process 800 whereby a caller may contact an enhanced services system to establish communications to a messaging client of a called party in accordance with an exemplary embodiment of the present invention.

Figure 8A:
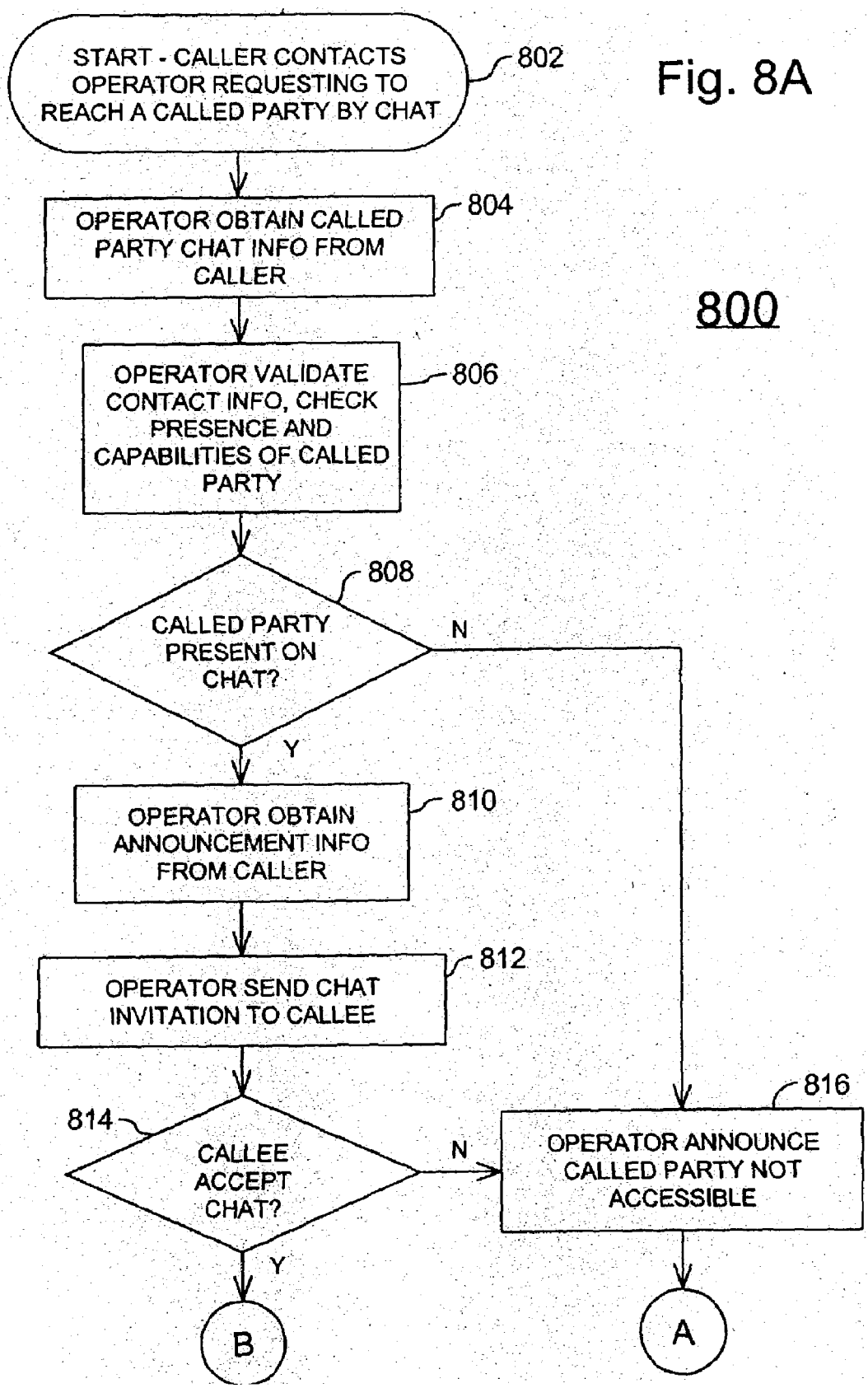
FIGS. 8A-8D depict a process by which a caller may contact an enhanced services system to establish communications to a messaging client of a called party in accordance with an exemplary embodiment of the present invention.

In FIG. 8A, process 800 commences in step 802 when a caller contacts a voice processing system for the purpose of establishing a chat session with a "called party." In contrast to the scenario described in process 700 wherein the party initially desired to establish a telephone call, process 806 relates to the caller preferring at the outset to establish a chat session with the called party. The caller might place a telephone call to a "1-800-GET-CHAT" telephone number, for example, to signify to the communications system the intent or desire to preferably establish communications via the instant communications client. Where the VPS 103 supports both process 700 and process 800, the number dialed by the caller to reach the system, or the trunk group by which the call comes to the system, may be used to differentiate handling of the call. The communications system may accordingly, act first to establish contact via a instant communications client in preference to other forms of communication that may be available.

Upon the caller reaching the system in step 802, an operator, either manual or automatic or a combination thereof, is connected to the caller and, in step 804, obtains information from the caller about the party they are trying to reach by chat. The operator may also collect other information such as account information to which the use of the system may be billed. In step 806, the operator validates at least the contact information provided by the caller and then verifies whether the party is present on a messaging system and determines capabilities for the destination party. Referring to FIG. 1, operator 52 may cause VPS 103 to obtain timely presence information from fetcher process 111 or watcher process 109 representing the available status of called party client 139.

In step 808, it is determined, based on the inquiry of step 806, whether or not the called party is present via a chat messaging client. If presence is not detected, then process 800 continues with step 816 wherein the operator informs the caller that the called party is not accessible, at least not by chat. Thereafter, process 800 continues, following the connector labeled 'A', to step 820 to offer the caller the option of placing a telephone call, as will be described in greater detail below.

Returning to step 808, if it is determined that the called party is present and available via chat messaging, then process 800 continues with step 810 wherein the operator obtains information proceeds to establish a chat session between the caller and the called party. In step 810, the operator performs a preparatory step in obtaining information from the caller as to how they wish to be announced to the called party. In step 812, the operator contacts the called party (or "callee") and invites the callee to participate in a chat session with the caller. In this invitation, the operator introduces the caller using the announcement information obtained in step 810.

Then, in step 814, the operator determines whether the callee accepts the offered chat communications. If not, then step 816 is performed wherein the operator informs the caller that the called party is not accessible, at least not by chat. Thereafter, process 800 continues, following the connector labeled 'A', to step 820 to offer the caller the option of placing a telephone call as will be described in greater detail below.

Returning to step 814, if the caller does accept the invitation to communicate with the caller via chat, then process 800 continues, following the connector labeled 'B', to step 840 (FIG. 8C) to initiate the chat session.

Figure 8B:
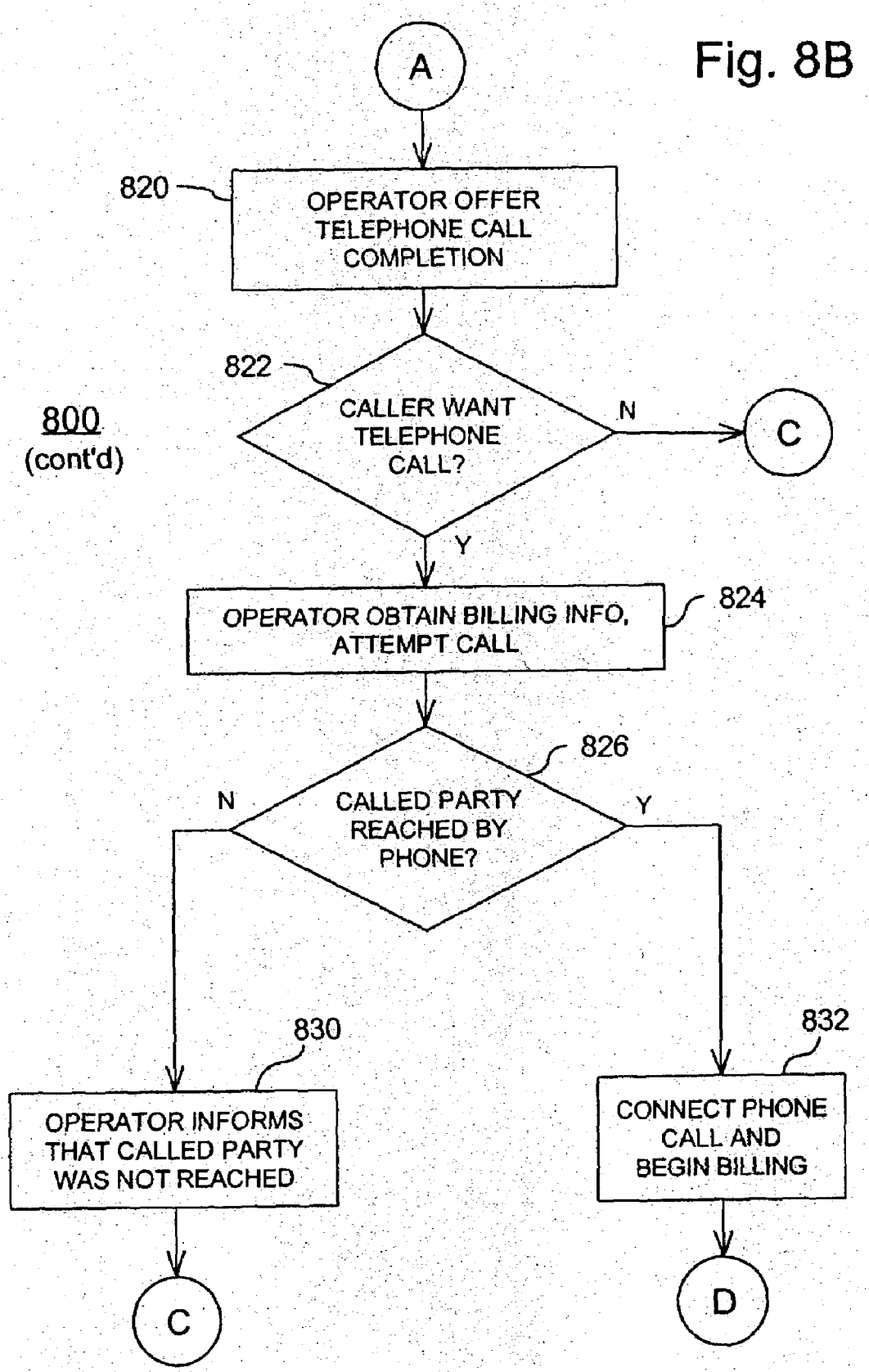
Figure 8C:
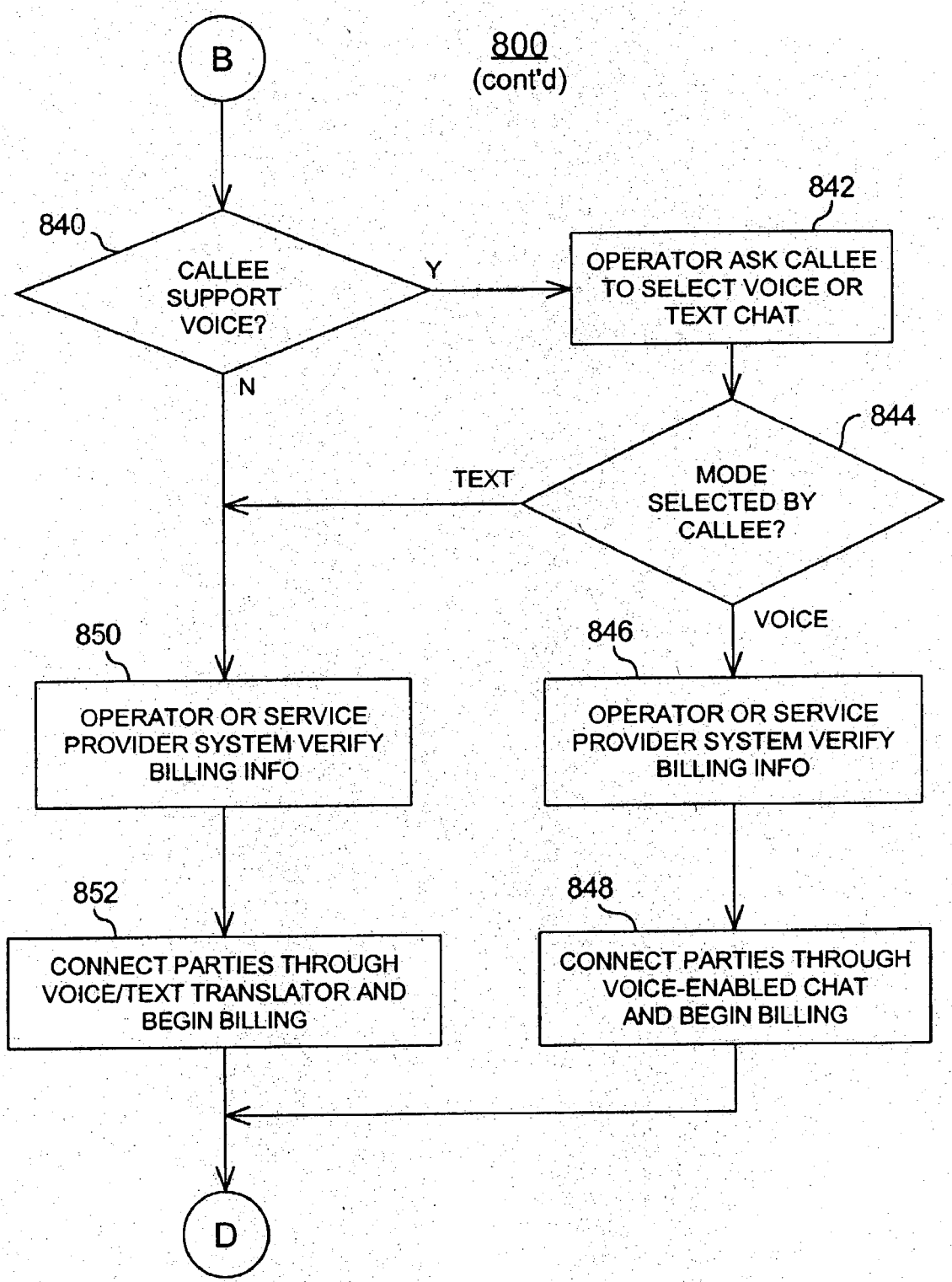

Referring to FIG. 8C, step 840 involves the operator determining whether or not the called party messaging client supports voice communications. If not, then a textual chat session is the only option for communicating with the called party and process 800 continues at step 850 wherein the operator or the service provider system verifies how the ensuing chat session will be billed, if applicable. As with other types of services, billing arrangements may include such arrangements as subscription, collect calling, prepaid calling, third-party pays, billing to credit card, etc.

Once any necessary billing arrangements are made in step 850, then, in step 852, the operator causes the parties to be connected together through a two-way voice/text translator and billing, if applicable, is initiated. This connection may be achieved in a manner described earlier in conjunction with FIG. 1 and FIG. 2B. After connecting in step 852, then process 800 proceeds, following the connector labeled 'D' to disengage the operator from the call in step 870. In this scenario, the VPS 103 may remain connected to the bridging switch and provide pass through to IIX 125. Alternatively, IIX 125 may be assigned some ports on the bridging switch and once the connection is made, the operator of VPS 103 may be released from the call.

Returning to step 840, if the callee's messaging client is found to support voice communications, then process 800 continues execution with step 842 wherein the operator asks the callee to select a voice-enabled chat session or a textual chat session.

In step 844, the callee's selection is determined and affects whether a voice session is established or textual chat session is established, the latter via steps 850 and 852 as already described. If the callee selects voice-enabled chat in step 844, then process 800 proceeds with step 846 to secure any necessary billing arrangements and then step 848 to establish the voice chat connection. Referring to FIG. 1, this connection may involve, for example, one or more of VPS 103, bridging switch 54, VoIP gateway 131 and IP network 133. After making the connection, process 800 proceeds, following the connector labeled 'D', to disengage the operator from the call in step 870.

Referring now to FIG. 8B, steps 820 through 832 relate to offering the caller an option of placing a telephone call to the called party in lieu of the chat session the caller originally desired. This option may be available to some types of service providers who offer telephony services or have business arrangements through telephone service providers.

In step 820, the operator offers the caller the option of trying to reach the called party by telephone, responsive to the previous attempt to chat with the called party having been unsuccessful.

In step 822, the caller's preference for a telephone call is determined. If the caller declines to try a telephone connection with the called party, then process 800 proceeds, following the connector labeled 'C', to explore other alternatives by which the caller might be able to communicate with the called party.

Otherwise, if, in step 822, the caller elects to try reaching the called party by phone, then, in step 824, the operator obtains information as to how the call is to be billed and then places the call to the called party.

In step 826, a determination is made as to whether or not the callee answers the phone and accepts any applicable charges, such as in a collect call scenario. If the called party, answers and otherwise accepts the call, then steps 832, 870 and 872 are performed to connect the call and begin billing, if applicable, disconnect the operator from the call and conclude the processing of process 800 in fulfillment of the caller's request.

Returning to step 826, if the called party does not answer, or answers and declines the call from the operator, then in step 830, the operator informs the caller that the callee is unavailable by phone. Thereafter, process 800 proceeds, following the connector labeled 'C', to explore other alternatives by which the caller might be able to communicate with the called party.

Figure 8D:
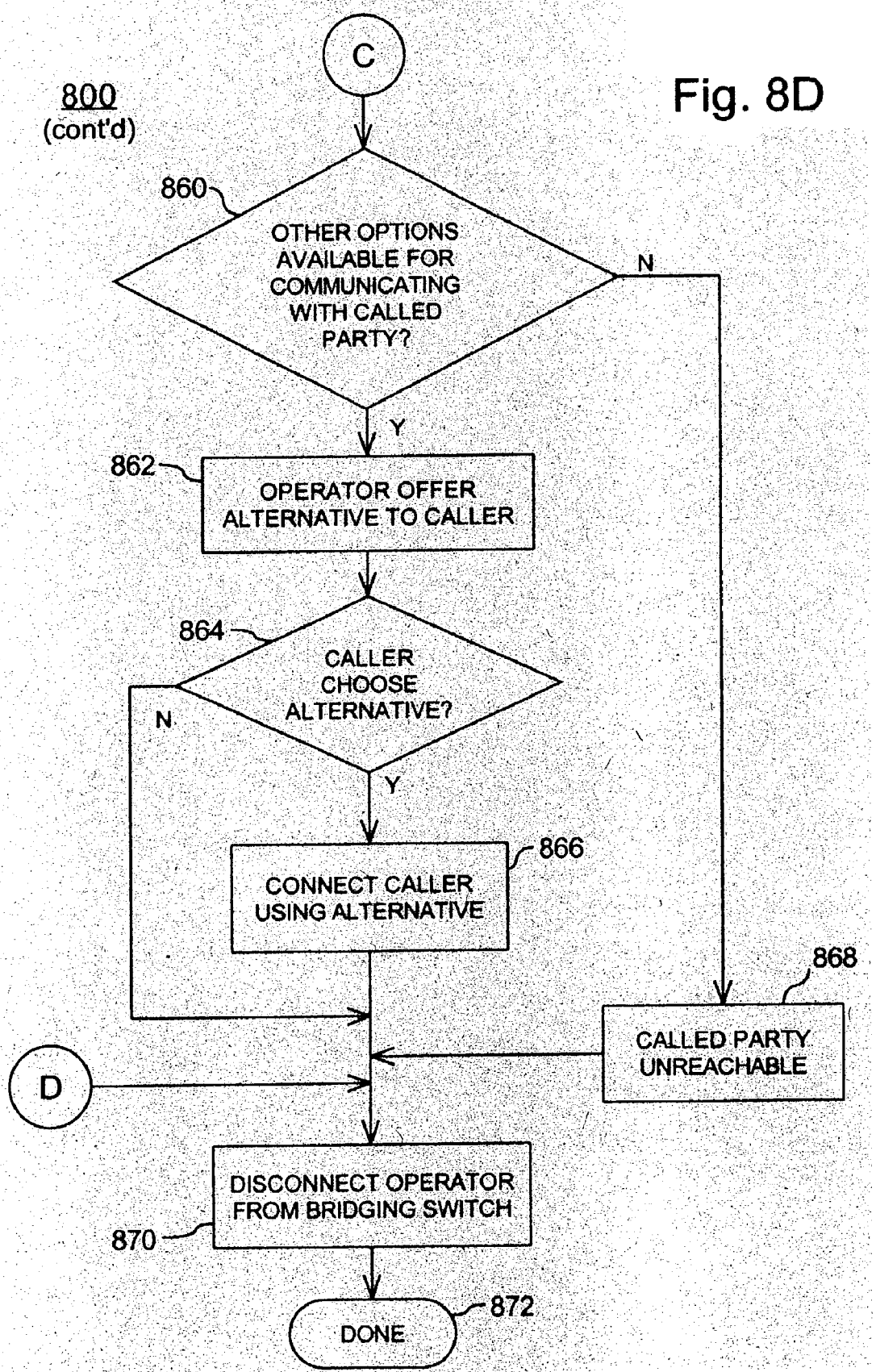

With reference now to FIG. 8D, steps 860 through 866 relate to determining if yet other alternatives may be offered to the caller for communicating with the called party. Such alternatives might include voice mail, paging, e-mail transcription, etc.

In step 860, the operator examines other such possibilities based on communications alternatives available to the operator through system 103 or based upon services for which the parties may be configured or subscribed. If no alternatives are available then, in step 868, the called party is declared unreachable and the operator will likely notify the caller that no further options remain. The session between caller and operator will then terminate, at least by the action of step 870, and then process 800 is concluded in step 872.

If at least one alternative is found available in step 860, then in step 862, the operator offers such alternative(s) to the caller. In step 864, if the caller elects an alternative, then the operator connects the caller to, or otherwise invokes, the alternative in step 866. In the caller declines any remaining alternatives presented in step 862, then the decision step 864, bypasses step 866 and proceeds directly to terminate the call, perhaps after a "bye" from the operator. Once the caller's selection is made in step 864 and any appropriate alternative is invoked, then the operator is disconnected from the caller in step 870 and then process 800 is concluded in step 872.

FIGS. 9A-9D describe a process 900 whereby a caller places a telephone call directly to a desired called party and, when the call goes unanswered or is otherwise configured to receive alternative processing, the call is diverted to a voice processing system to offer the caller messaging and other alternatives by which to reach the same called party.

Process 900 begins with step 902 upon the system detecting or receiving indication that a telephone call has gone unanswered. It is also conceivable that another system, such as telephone network 80, may detect the unanswered call and merely redirect the call to VPS 103. Methods by which a system may detect or be informed of a 'no answer' event are known in the industry. This is evidenced among local exchange carriers in the United States, such as Qwest Communications International, Inc., who perform a feature whereby, when a telephone goes unanswered after several rings, an automated voice prompt bridges onto the line and offers, for a fee, to continue trying to reach the called party and to ring the caller's telephone when the called party eventually answers. In the present discussion, an unanswered phone may be due to a so-called "ring—no answer" event or a "line is busy" event. A telephone caller may also encounter a disconnected line, an "all circuits busy" condition or other problems preventing the call from being completed. In any case, process 900 continues with step 904 wherein the call is diverted to an operator within the service provider system. In step 906, the operator greets the caller and offers to assist in reaching the party by other means, such as by a chat session. In step 907, the operator explores available alternatives, based on communications alternatives available to the operator through system 103 or based upon services for which the parties may be configured or subscribed.

In step 908, it is determined whether, according to information gleaned in step 907, chat messaging is a viable possibility for reaching the called party. Chat messaging may be impermissible, for example, if the system requires either or both of the caller and called party to be subscribed users of such service and neither of them are subscribed. If chat is not an option, then process 900 continues, following the connector labeled 'C', to step 960 of FIG. 9D to pursue other possible communications options.

If the system requires either or both of the caller and called party to be subscribed users of such service and neither of them are subscribed. If chat is not an option, then process 900 continues, following the connector labeled 'C', to step 960 of FIG. 9D to pursue other possible communications options.

Otherwise, if, in step 908, chat messaging is seemingly viable, then process 900 continues, following the connector labeled 'A', to step 920 to attempt to establish a chat session with the called party.

Figure 9A:
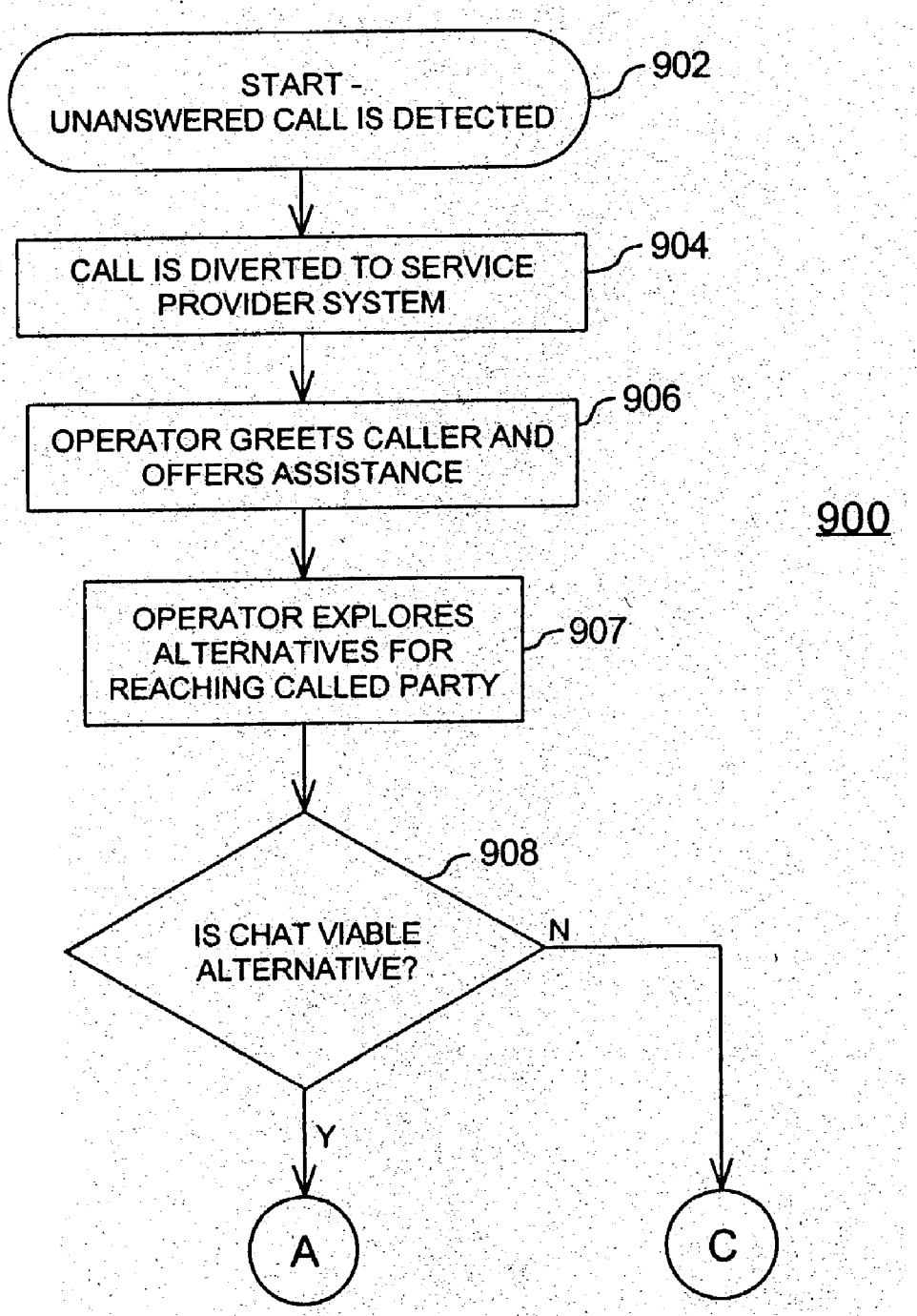
Figure 9C:
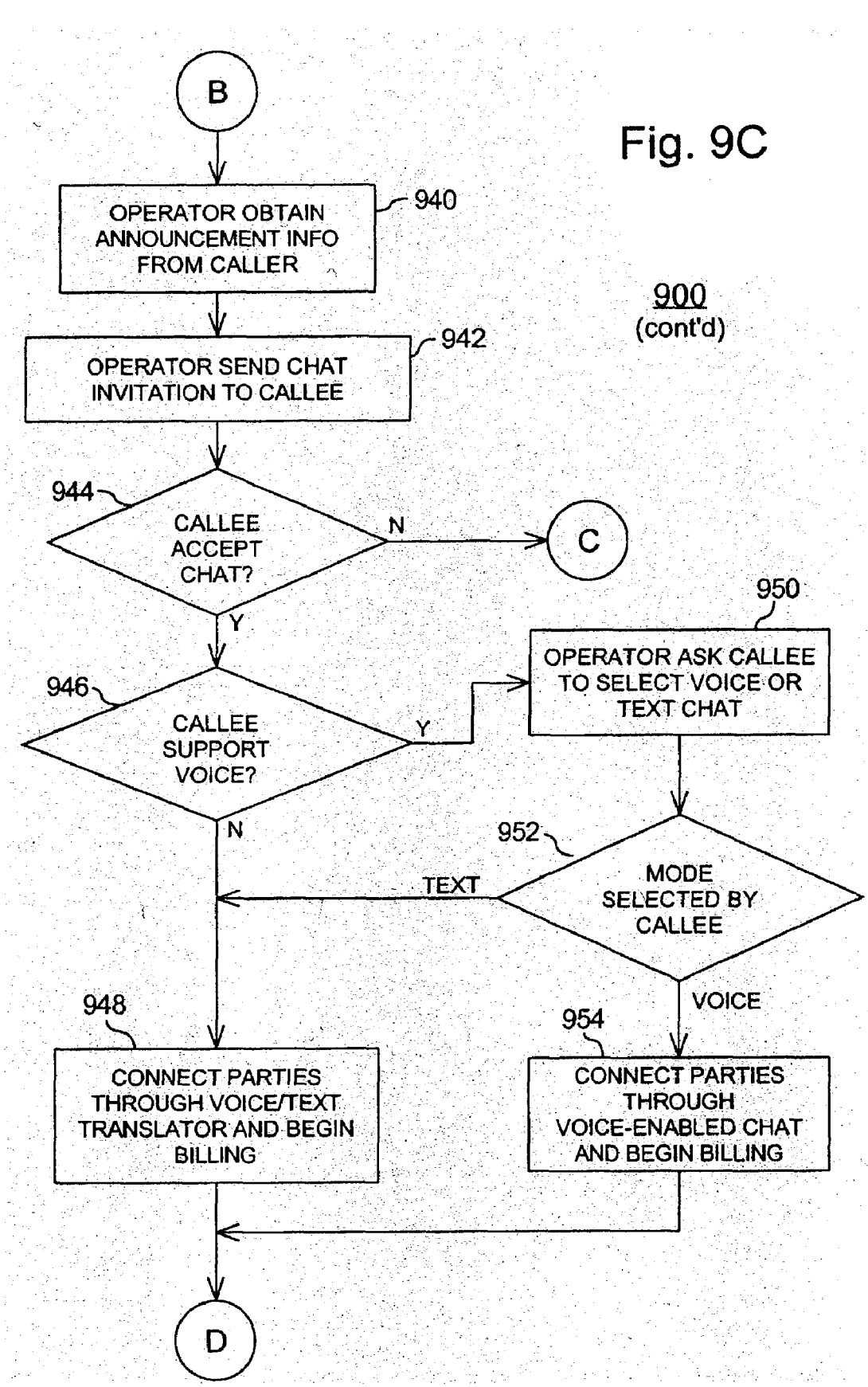
Figure 9D:
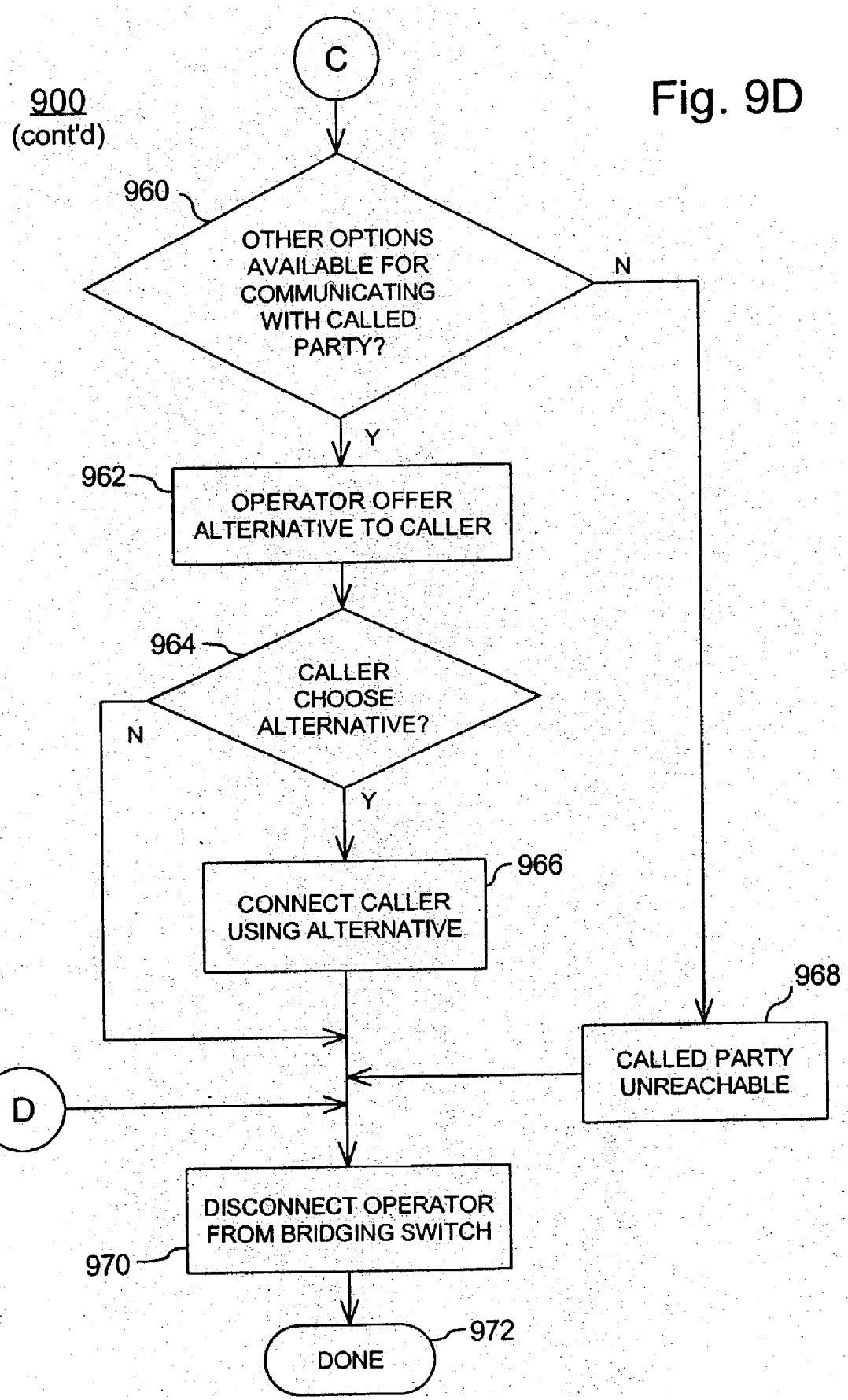

The remainder of process 900 as depicted in FIGS. 9B, 9C and 9D is essentially identical to corresponding steps depicted in FIGS. 7B, 7C and 8D, respectively.

As will be readily apparent to persons of ordinary skill in the relevant art, any of the functional elements, systems and processes depicted in FIGS. 1 through 9D may be implemented in various ways using, for example, suitably equipped data processing systems or computing environments. Such implementations may comprise hardware, firmware, software, or combinations thereof, to accomplish intended functions in accordance with the teachings of the present invention. For example, any or all of voice processing system 103, billing system 123, intelligent information translator 125 and intelligent presence gateway 105, or functional subsystems depicted therein, may be implemented as processes in a program-controlled computing environment. Processes depicted in FIGS. 2A through 9D may be implemented wholly or partially as processing threads occurring within a computer processor under software and/or firmware control. A given process may be implemented in a distributed fashion among multiple physical processors or multiple logical processing threads. A single processor may participate in implementing multiple instances or multiple types of the processes shown. Any of the functions shown, or the hardware used to implement these functions, may be distributed among remote locations or may be collocated.

It will also be appreciated that connectivity among elements for carrying control signals, telephony-style signaling, bearer channel signals and messaging traffic and the like, may be accomplished via communications through a network or a shared bus or shared memory resources or by inter-process communications.

Even signals representing telephone audio signals may be conveyed to processing equipment in the form of data through a bus or network. Methods and devices for converting among analog audio signals and digital data are well known and are not explicitly shown in FIG. 1, although it is common that telephone network 80 or VPS 103 are equipped to perform these conversions. Adaptation to external systems, such as the PSTN as represented by telephone network 80, may be accomplished by the use of well-known computer-telephony adapter cards (as those made by Dialogic Communications Corporation), commercially available automatic call distributors (ACDs) and Private Branch Exchange (PBX) equipment.

An exemplary arrangement of computing hardware suitable for implementing functional elements and processes in accordance with the present invention will now be described in conjunction with FIG. 6, although it should be understood that aspects of the present invention may be embodied in other ways.

Hardware Overview

Figure 6:
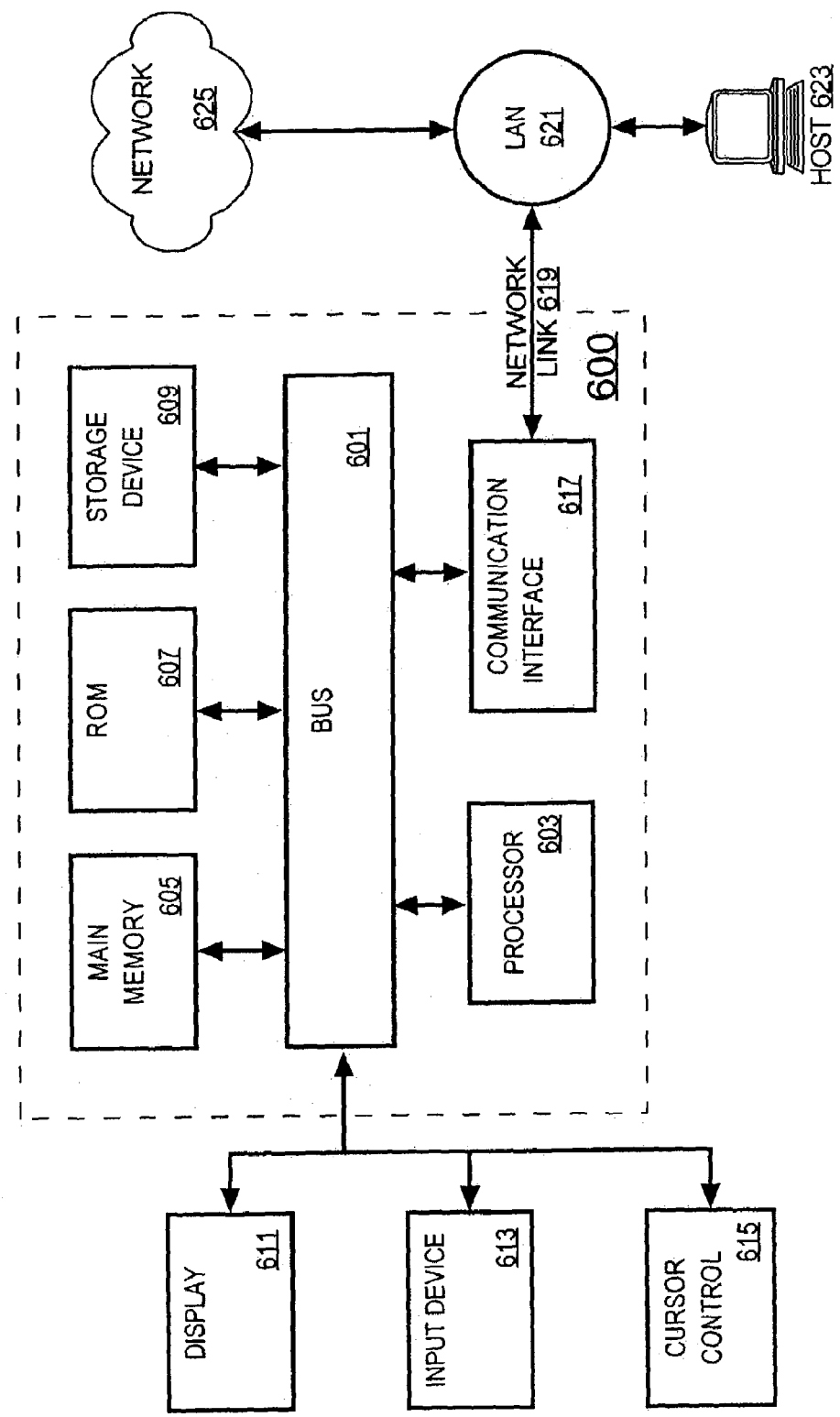
FIG. 6 depicts a computer system that can be used to implement an embodiment of the present invention.

FIG. 6 illustrates a computer system 600 upon which an embodiment according to the present invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, call processing is provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps in accordance with any or all of the processes described or implied herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 605 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire, and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

For example, although aspects of the present invention have been described with respect to computer systems executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

While the present invention has been described in connection with a number of embodiments and implementations, the present invention is not so limited but covers various obvious modifications and equivalent arrangements, which fall within the purview of the appended claims.

What is claimed is:

1. A method of providing service in a communications system comprising:
   from a first party using a telephone device, receiving a request to establish communications with a second party;
   from a presence-determining element, obtaining presence information related to the availability of the second party to engage in communications wherein the presence information is already maintained in the presence-determining element before the receiving the request;
   responding to the request to establish communications with the second party responsive at least to the presence information by acting to establish communications with the second party; and
   indicating, to a billing system, activity pertaining to the obtaining the presence information.

2. The method of claim 1 wherein the communications comprise instant messaging communications.

3. The method of claim 1 further comprising:
   determining billable usage of the system related to usage of the communication system by at least one of the first party and the second party.

4. The method of claim 3 further comprising:
   determining whether payment can be obtained for usage charges pertaining to the billable usage; and
   selectively performing the establishing communications between the first party and the second party responsive at least to whether payment can be obtained for the usage charges.

5. The method of claim 1 wherein the communications comprise instant messaging communications.

6. The method of claim 1 wherein the communications comprise communicating with an instant communications client associated with the second party.

7. The method of claim 6 further comprising:
   causing audio information from the first party to be translated into corresponding textual information communicated to the instant communications client.

8. The method of claim 6 further comprising:
   causing textual information from the instant communications client to be translated into corresponding audio information communicated to the first party.

9. The method of claim 1 wherein the acting to establish communications with the second party comprises causing a communications network element to establish communications involving the second party.

10. The method of claim 9 wherein the communications network element is a gateway.

11. The method of claim 1 further comprising:
    providing, to the presence-determining element, a presence identifier associated with the second party, wherein the presence identifier specifies that presence information is sought for the second party.

12. The method of claim 11 wherein the presence identifier is a screen name associated with the instant communications client by which the second party may be reached.

13. The method of claim 11 further comprising:
    obtaining the presence identifier from the first party.

14. The method of claim 11 wherein the presence identifier comprises at least one of: a screen name, a logical address, a physical address, an electronic pseudonym, a chat identifier, an instant messaging identifier, an alias, a telephone number, an email address, a physical address, a uniform resource locator (URL), a universal resource identifier (URI), a given name and a personal identification number.

15. The method of claim 11 further comprising:
    from the first party, obtaining identifying information for identifying the second party; and
    determining the presence identifier corresponding to the identifying information.

16. The method of claim 15 further comprising:
    indicating, to the billing system, activity pertaining to the obtaining the presence identifier based on the identifying information.

17. The method of claim 15 wherein the identifying information comprises at least one of: a screen name, a logical address, a physical address, an electronic pseudonym, a chat identifier, an instant messaging identifier, an alias, a telephone number, an email address, a uniform resource locator (URL), a universal resource identifier (URI), a given name and a personal identification number.

18. The method of claim 11 further comprising:
obtaining from a capabilities-determining element information pertaining to the manner by which the first party may communicate with the second party.

19. The method of claim 18 further comprising:
providing to the capabilities-determining element, a capabilities identifier associated with the second party.

20. The method of claim 19 wherein the capabilities identifier is the same as the presence identifier.

21. The method of claim 1 further comprising:
providing to the second party an identifier associated with the first party.

22. The method of claim 21 wherein the identifier associated with the first party comprises at least one of: a screen name, a logical address, a physical address, an electronic pseudonym, a chat identifier, an instant messaging identifier, an alias, a telephone number, an email address, a uniform resource locator (URL), a universal resource identifier (URI), a given name and a personal identification number.

23. The method of claim 21 wherein the identifier associated with the first party is obtained from the first party.

24. A voice processing system for providing service to parties in a communications system comprising:
means for receiving, from a first party using a telephone device, a request to establish communications with a second party;
means for obtaining, from a presence-determining element, presence information related to the availability of the second party to engage in communications wherein the presence information is already maintained in the presence-determining element before the receiving the request;
means for responding to the request to establish communications with the second party responsive at least to the presence information; and
a billing system interface for communicating, with a billing system, information about billable usage of the communications system pertaining to the obtaining of the presence information.

25. The voice processing system of claim 24 further comprising:
means for determining whether payment can be obtained for usage charges pertaining to the billable usage, wherein the responding to the request is selectively performed responsive at least to whether payment can be obtained for usage charges.

26. The voice processing system of claim 24 wherein the communications with the second party involve an instant communications client associated with the second party.

27. The voice processing system of claim 26 further comprising:
means for causing textual information from the instant communications client to be translated into corresponding audio information communicated to the first party.

28. The voice processing system of claim 26 further comprising:
means for causing audio information from the first party to be translated into corresponding textual information communicated to the instant communications client.

29. The voice processing system of claim 24 further comprising:
means for obtaining from a capabilities-determining element information pertaining to the manner by which the first party may communicate with the second party.

30. The voice processing system of claim 24 further comprising:
means for providing, to the presence-determining element, a presence identifier associated with the second party, wherein the presence identifier specifies that presence information is sought for the second party.

31. The voice processing system of claim 30 further comprising:
means for obtaining the presence identifier from the first party.

32. The voice processing system of claim 30 further comprising:
means for obtaining, from the first party, identifying information for identifying the second party; and
means for determining the presence identifier corresponding to the identifying information.

33. The voice processing system of claim 24 further comprising:
providing to the second party an identifier associated with the first party.

34. The voice processing system of claim 33 wherein the identifier associated with the first party comprises at least one of: a screen name, a logical address, a physical address, an electronic pseudonym, a chat identifier, an instant messaging identifier, an alias, a telephone number, an email address, a uniform resource locator (URL), a universal resource identifier (URI), a given name and a personal identification number.

35. The voice processing system of claim 33 wherein the identifier associated with the first party is obtained from the first party.

36. The computer readable medium of claim 33 wherein the identifier associated with the first party comprises at least one of: a screen name, a logical address, a physical address, an electronic pseudonym, a chat identifier, an instant messaging identifier, an alias, a telephone number, an email address, a uniform resource locator (URL), a universal resource identifier (URI), a given name and a personal identification number.

37. The computer readable medium of claim 33 wherein the identifier associated with the first party is obtained from the first party.

38. In a communication system, a device acting to establish communications comprising:
a telephony interface acting to communicate with a first party via a telephone call;
an interactive response station acting to conduct an interactive session with the first party via the telephone call;
a presence interface acting to obtain presence information pertaining to a second party;
a bearer channel interface operably coupled to an instant communications client associated with the second party, the bearer channel interface acting to establish communications between the first and second parties responsive to at least one of the interactive session and the presence information; and
a billing system interface for communicating, with a billing system, information about billable usage of the communications system pertaining to the obtaining of the presence information.

39. The device of claim 33 further comprising a network signaling interface acting to coordinate with a network in establishing communications between the first and second parties.

40. The device of claim 38 further comprising:
means for determining whether payment can be obtained for usage charges pertaining to the billable usage, wherein the bearer channel interface acts to establish communications between the first and second parties responsive at least to whether payment can be obtained for the usage charges.

41. In a communication system, a device operable to establish communications comprising:
  telephony interface means for communicating with a first party via a telephone call;
  interactive response means for conducting an interactive session with the first party via the telephone call;
  presence determining means for obtaining presence information pertaining to a second party;
  bearer channel interface means operably coupled to an instant communications client associated with the second party, wherein the bearer channel interface means establishes communications between the first and second parties responsive to at least one of the interactive session and the presence information; and
  a billing system interface for communicating, with a billing system, information about billable usage of the communications system pertaining to the obtaining of the presence information.

42. The device of claim 41 further comprising:
  means for determining whether payment can be obtained for usage charges pertaining to the billable usage, wherein the establishing communications between the first party and the second party is selectively performed responsive at least to whether payment can be obtained for usage charges.

43. The device of claim 41 further comprising:
  network signaling interface means for coordinating with a network in establishing communications between the first and second parties.

44. A voice processing system for providing service to parties in a communications system comprising:
  means for receiving, from a first party using a telephone device, a request to establish communications with a second party;
  means for obtaining, from a presence-determining element, presence information related to the availability of the second party to engage in communications using an instant communications client;
  means for responding to the request to establish communications with the second party responsive at least to the presence information; and
  a billing system interface means for communicating, with a billing system, information about billable usage of the communications system pertaining to the obtaining of the presence information.

45. The voice processing system of claim 44 further comprising:
  means for determining whether payment can be obtained for usage charges pertaining to the billable usage, wherein the responding to the request is selectively performed responsive at least to whether payment can be obtained for usage charges.

46. The voice processing system of claim 44 further comprising:
  means for causing audio information from the first party to be translated into corresponding textual information communicated to the instant communications client.

47. The voice processing system of claim 44 further comprising:
  means for causing textual information from the instant communications client to be translated into corresponding audio information communicated to the first party.

48. The voice processing system of claim 44 further comprising:
  means for obtaining, from a capabilities-determining element, information pertaining to the manner by which the first party may communicate with the second party.

49. The voice processing system of claim 48 further comprising:
  means for providing, to the capabilities-determining element, an identifier which specifies at least one of the first party and the second party for which capabilities information is sought from the capabilities determining element.

50. The voice processing system of claim 44 further comprising:
  means for providing, to the presence-determining element, a presence identifier associated with the second party, wherein the presence identifier specifies that presence information is sought for the second party.

51. The voice processing system of claim 50 further comprising:
  means for obtaining the presence identifier from the first party.

52. The voice processing system of claim 50 further comprising:
  means for obtaining, from the first party, identifying information for identifying the second party; and
  means for determining the presence identifier corresponding to the identifying information.

53. A method of providing service in a communications system comprising:
  from a first party using a telephone device, receiving a request to establish communications with a second party;
  from a presence-determining element, obtaining presence information related to the availability of the second party to engage in communications using an instant communications client;
  responding to the request to establish communications with the second party responsive at least to the presence information by acting to establish communications with the second party; and
  indicating, to a billing system, activity pertaining to the obtaining the presence information.

54. The method of claim 53 wherein the communications comprise instant communications.

55. The method of claim 53 further comprising:
  determining billable usage of the system related to usage of the communication system by at least one of the first party and the second party.

56. The method of claim 55 further comprising:
  determining whether payment can be obtained for usage charges pertaining to the billable usage; and
  selectively performing the establishing communications between the first party and the second party responsive at least to whether payment can be obtained for the usage charges.

57. The method of claim 53 further comprising:
  causing audio information from the first party to be translated into corresponding textual information communicated to the instant communications client.

58. The method of claim 53 further comprising:
  causing textual information from the instant communications client to be translated into corresponding audio information communicated to the first party.

59. The method of claim 53 wherein the responding to the request comprises causing a communications network element to establish communications involving the second party.

60. The method of claim 59 wherein the communications network element is a gateway.

61. The method of claim 53 further comprising:
providing, to the presence-determining element, a presence identifier associated with the second party, wherein the presence identifier specifies that presence information is sought for the second party.

62. The method of claim 61 wherein the presence identifier is a screen name associated with the instant communications client by which the second party may be reached.

63. The method of claim 61 further comprising:
obtaining the presence identifier from the first party.

64. The method of claim 61 wherein the presence identifier comprises at least one of: a screen name, a logical address, a physical address, an electronic pseudonym, a chat identifier, an instant messaging identifier, an alias, a telephone number, an email address, a uniform resource locator (URL), a universal resource identifier (URI), a given name and a personal identification number.

65. The method of claim 61 further comprising:
from the first party, obtaining identifying information for identifying the second party; and
determining the presence identifier corresponding to the identifying information.

66. The method of claim 65 further comprising:
indicating, to said billing system, activity pertaining to the obtaining the presence identifier based on the identifying information.

67. The method of claim 65 wherein the identifying information comprises at least one of: a screen name, a logical address, a physical address, an electronic pseudonym, a chat identifier, an instant messaging identifier, an alias, a telephone number, an email address, a uniform resource locator (URL), a universal resource identifier (URI), a given name and a personal identification number.

68. The method of claim 61 further comprising:
obtaining from a capabilities-determining element information pertaining to the manner by which the first party may communicate with the second party.

69. The method of claim 61 further comprising:
providing to the capabilities-determining element, a capabilities identifier associated with the second party.

70. The method of claim 69 wherein the capabilities identifier is the same as the presence identifier.

71. A computer-readable medium comprising instructions which, when executed by a processor, perform a method for providing service to parties in a communications system, the method comprising:
receiving, from a first party using a telephone device, a request to establish communications with a second party;
obtaining, from a presence-determining element, presence information related to the availability of the second party to engage in communications using an instant communications client;
responding to the request to establish communications with the second party responsive at least to the presence information by acting to establish communications between the first party and the second party; and
indicating, to a billing system, activity pertaining to the obtaining of the presence information.

72. The computer-readable medium of claim 71 wherein the method further comprises:
causing audio information from the first party to be translated into corresponding textual information communicated to the instant communications client.

73. The computer-readable medium of claim 72 wherein the method further comprises:
indicating, to the billing system, activity pertaining to the causing the audio information from the first party to be translated.

74. The computer-readable medium of claim 71 wherein the method further comprises:
causing textual information from the instant communications client to be translated into corresponding audio information communicated to the first party.

75. The computer-readable medium of claim 74 wherein the method further comprises:
indicating, to the billing system, activity pertaining to the causing the textual information from the instant communications client to be translated.

76. The computer-readable medium of claim 71 wherein the method further comprises:
obtaining, from a capabilities-determining element, information pertaining to the manner by which the first party may communicate with the second party.

77. The computer-readable medium of claim 71 wherein the method further comprises:
providing, to the presence-determining element, a presence identifier associated with the second party, wherein the presence identifier specifies that presence information is sought for the second party.

78. The computer-readable medium of claim 77 wherein the method further comprises:
obtaining the presence identifier from the first party.

79. The computer-readable medium of claim 77 wherein the method further comprises:
obtaining, from the first party, identifying information for identifying the second party; and
determining the presence identifier corresponding to the identifying information.

80. The computer-readable medium of claim 77 wherein the method further comprises:
indicating, to the billing system, activity pertaining to the obtaining the presence identifier based on the identifying information.

81. A computer-readable medium comprising instructions which, when executed by a processor, perform a method of providing service to parties in a communications system, the method comprising:
receiving, from a first party using a telephone device, a request to establish communications with a second party;
obtaining, from a presence-determining element, presence information related to the availability of the second party to engage in communications wherein the presence information is already maintained in the presence-determining element before the receiving the request;
responding to the request to establish communications with the second party responsive at least to the presence information; and
indicating, to a billing system, activity pertaining to the obtaining of the presence information.

82. The computer-readable medium of claim 81 wherein the method further comprises:
responsive to the request, acting to establish communications between the first party and the second party.

83. The computer-readable medium of claim 81 wherein the communications with the second party involve an instant communications client associated with the second party.

84. The computer-readable medium of claim 83 wherein the method further comprises: causing textual information from the instant communications client to be translated into corresponding audio information communicated to the first party.

85. The computer-readable medium of claim 83 wherein the method further comprises:
   causing audio information from the first party to be translated into corresponding textual information communicated to the instant communications client.

86. The computer-readable medium of claim 81 wherein the method further comprises:
   obtaining from a capabilities-determining element information pertaining to the manner by which the first party may communicate with the second party.

87. The computer-readable medium of claim 81 wherein the method further comprises:
   providing, to the presence-determining element, a presence identifier associated with the second party, wherein the presence identifier specifies that presence information is sought for the second party.

88. The computer-readable medium of claim 87 wherein the method further comprises:
   obtaining the presence identifier from the first party.

89. The computer-readable medium of claim 81 wherein the method further comprises:
   from the first party, obtaining identifying information for identifying the second party; and
   determining the presence identifier corresponding to the identifying information.

90. The computer-readable medium of claim 89 wherein the method further comprises:
   indicating, to the billing system, activity pertaining to the obtaining the presence identifier based on the identifying information.

91. The computer readable medium of claim 81 wherein the method further comprises:
   providing to the second party an identifier associated with the first party.

* * * * *